(12) United States Patent
Ogauchi et al.

(10) Patent No.: US 9,382,981 B2
(45) Date of Patent: Jul. 5, 2016

(54) AUTOMATIC TRANSMISSION

(71) Applicant: MAZDA MOTOR CORPORATION, Hiroshima (JP)

(72) Inventors: Yasuhiro Ogauchi, Higashihiroshima (JP); Masaru Nakagishi, Hiroshima (JP); Shinya Kamada, Kure (JP); Tatsuhiko Iwasaki, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/431,510

(22) PCT Filed: Aug. 7, 2014

(86) PCT No.: PCT/JP2014/004128
§ 371 (c)(1),
(2) Date: Mar. 26, 2015

(87) PCT Pub. No.: WO2015/045257
PCT Pub. Date: Apr. 2, 2015

(65) Prior Publication Data
US 2016/0025190 A1    Jan. 28, 2016

(30) Foreign Application Priority Data

Sep. 30, 2013   (JP) ................. 2013-202901

(51) Int. Cl.
*F16H 3/62*   (2006.01)
*F16H 3/66*   (2006.01)
*F16H 37/08*  (2006.01)

(52) U.S. Cl.
CPC ............ *F16H 3/666* (2013.01); *F16H 37/0813* (2013.01); *F16H 2200/006* (2013.01); *F16H 2200/2012* (2013.01); *F16H 2200/2015* (2013.01); *F16H 2200/2043* (2013.01)

(58) Field of Classification Search
None
See application file for complete search history.

(56) References Cited

U.S. PATENT DOCUMENTS

| | | | |
|---|---|---|---|
| 2004/0048716 A1 | 3/2004 | Ziemer | |
| 2005/0003924 A1 | 1/2005 | Tabata et al. | |
| 2008/0234093 A1* | 9/2008 | Diosi | F16H 3/66 475/276 |
| 2008/0261749 A1 | 10/2008 | Tabata et al. | |
| 2008/0261751 A1 | 10/2008 | Hart et al. | |
| 2008/0300095 A1 | 12/2008 | Doi et al. | |
| 2012/0178578 A1* | 7/2012 | Mellet | F16H 3/66 475/254 |
| 2013/0267369 A1* | 10/2013 | Beck | F16H 3/66 475/275 |
| 2014/0057751 A1* | 2/2014 | Mellet | F16H 3/62 475/54 |

(Continued)

FOREIGN PATENT DOCUMENTS

| | | |
|---|---|---|
| DE | 102008000207 A1 | 8/2009 |
| JP | 2004-529297 A | 9/2004 |
| JP | 2005-127497 A | 5/2005 |

(Continued)

*Primary Examiner* — Edwin A Young
(74) *Attorney, Agent, or Firm* — Studebaker & Brackett PC

(57) ABSTRACT

An automatic transmission (10) includes an input shaft (12), an output (an output shaft 13) arranged coaxially with the input shaft and engaged with a differential mechanism, first and second planetary gear sets (PG1 and PG2) of a double pinion type, third and fourth planetary gear sets (PG3 and PG4) of a single pinion type, first to third clutches (CL1-CL3) engaging and disengaging predetermined rotating elements of the first to fourth planetary gear sets, and first and second brakes (BR1 and BR2) engaging and disengaging a second carrier (C2) and a first carrier (C1) from a transmission case (11). A gear ratio of the automatic transmission is 1 in a sixth gear.

2 Claims, 21 Drawing Sheets

(56) References Cited

U.S. PATENT DOCUMENTS

2014/0106923 A1* 4/2014 Borgerson ............... F16H 3/66
                                                        475/275

FOREIGN PATENT DOCUMENTS

| JP | 2008-298126 A | 12/2008 |
| JP | 2009-174626 A | 8/2009 |

* cited by examiner

FIG.2

|  | CL1 | CL2 | CL3 | BR1 | BR2 |
|---|---|---|---|---|---|
| FIRST GEAR |  | ○ |  | ○ | ○ |
| SECOND GEAR | ○ |  |  | ○ | ○ |
| THIRD GEAR | ○ | ○ |  |  | ○ |
| FOURTH GEAR | ○ |  | ○ |  | ○ |
| FIFTH GEAR |  | ○ | ○ |  | ○ |
| SIXTH GEAR | ○ | ○ | ○ |  |  |
| SEVENTH GEAR |  | ○ | ○ | ○ |  |
| EIGHTH GEAR | ○ |  | ○ | ○ |  |
| REVERSE GEAR |  |  | ○ | ○ | ○ |

<FIRST GEAR>

<FIRST GEAR>

○——○ NORMALLY ENGAGED
✕······✕ ENGAGED BY CLUTCH
✕ FIXED BY BRAKE
● INPUT/OUTPUT ROTATION

<SECOND GEAR>

<SECOND GEAR>

○———○ NORMALLY ENGAGED
×------× ENGAGED BY CLUTCH
× FIXED BY BRAKE
● INPUT/OUTPUT ROTATION

<THIRD GEAR>

<THIRD GEAR>

○——○ NORMALLY ENGAGED
×------× ENGAGED BY CLUTCH
✖ FIXED BY BRAKE
● INPUT/OUTPUT ROTATION

<FOURTH GEAR>

<FOURTH GEAR>

○———○ NORMALLY ENGAGED
×--------× ENGAGED BY CLUTCH
✕ FIXED BY BRAKE
● INPUT/OUTPUT ROTATION

○──○ NORMALLY ENGAGED
✕┄┄✕ ENGAGED BY CLUTCH
✕ FIXED BY BRAKE
● INPUT/OUTPUT ROTATION

○——○ NORMALLY ENGAGED
×------× ENGAGED BY CLUTCH
✕ FIXED BY BRAKE
● INPUT/OUTPUT ROTATION

<SEVENTH GEAR>

<SEVENTH GEAR>

○——○ NORMALLY ENGAGED
×----× ENGAGED BY CLUTCH
× FIXED BY BRAKE
● INPUT/OUTPUT ROTATION

<EIGHTH GEAR>

<EIGHTH GEAR>

○———○ NORMALLY ENGAGED
×--------× ENGAGED BY CLUTCH
✕ FIXED BY BRAKE
● INPUT/OUTPUT ROTATION

FIG.19

|  | SUN GEAR | RING GEAR | FIRST PINION | SECOND PINION |
|---|---|---|---|---|
| PG1 | 45 | 108 | 32 | 32 |
| PG2 | 54 | 108 | 27 | 27 |
| PG3 | 39 | 108 | 35 |  |
| PG4 | 45 | 108 | 32 |  |

FIG.20

|  | GEAR RATIO | GEAR STEP |
|---|---|---|
| FIRST GEAR | 4.800 |  |
| SECOND GEAR | 3.537 | 1.357 |
| THIRD GEAR | 2.400 | 1.474 |
| FOURTH GEAR | 1.790 | 1.340 |
| FIFTH GEAR | 1.412 | 1.286 |
| SIXTH GEAR | 1.000 | 1.412 |
| SEVENTH GEAR | 0.828 | 1.208 |
| EIGHTH GEAR | 0.706 | 1.172 |
| REVERSE GEAR | -2.877 |  |

AUTOMATIC TRANSMISSION

TECHNICAL FIELD

The present invention relates to an automatic transmission mounted in a vehicle.

BACKGROUND ART

In general, an automatic transmission mounted in a vehicle includes a plurality of planetary gear sets (planetary gear mechanisms), and a plurality of hydraulic frictional coupling elements such as clutches and brakes. These frictional coupling elements are selectively engaged by hydraulic control to change power transmission paths through the planetary gear sets, thereby providing a plurality of forward gears and usually one reverse gear.

For example, PATENT DOCUMENT 1 discloses an automatic transmission, which includes three planetary gear sets of a single pinion type, and five frictional coupling elements. Two of the frictional coupling elements are engaged to provide one of six forward gears and one reverse gear.

In recent years, there is a growing demand for an increase in the number of forward gears to improve the fuel efficiency of an engine and transmission performance. For example, an automatic transmission suggested includes three planetary gear sets and six frictional coupling elements, and provides eight forward gears by combining two of these frictional coupling elements.

In this configuration, however, four of the frictional coupling elements are disengaged in each gear stage. The sliding friction between the friction plates of the disengaged frictional coupling elements or the viscous resistance of the lubricant between the friction plates or any other factor increases the drive loss of the automatic transmission as a whole. This may hinder an improvement in the fuel efficiency, which is the advantage in increasing the number of gears.

PATENT DOCUMENT 2 discloses an automatic transmission including two planetary gear sets of a single pinion type, two planetary gear sets of a double pinion type, and five frictional coupling elements. Three of the frictional coupling elements are selectively engaged to provide eight forward gears.

In this configuration, two of the frictional coupling elements are disengaged in each gear stage, thereby reducing the above-described drive loss. In addition, the planetary gear sets of the double pinion type are also used, which are more flexible than planetary gear sets of the single pinion type in setting gear ratios. As a result, proper setting of a gear step between two successive gears can be expected. The gear step is obtained by dividing the gear ratio in an n-th gear (where n is an integer) by the gear ratio in the (n+1)-th gear.

CITATION LIST

Patent Document

[PATENT DOCUMENT 1] Japanese Unexamined Patent Publication No. 2008-298126
[PATENT DOCUMENT 2] Japanese Unexamined Patent Publication No. 2009-174626

SUMMARY OF THE INVENTION

Technical Problem

However, the automatic transmission disclosed in PATENT DOCUMENT 2 provides a gear ratio of 1 (i.e., direct drive) in the fifth gear. Only four gears (underdrive gears) have gear ratios higher than 1. Thus, an attempt to gain proper gear steps reduces the gear ratios of low gears (e.g., a first gear, a second gear, etc.). In the case where a vehicle has an engine with a small displacement relative to the weight of the vehicle, the drive power, particularly the start-up acceleration may be insufficient. To address this problem, the first gear has a significantly high gear ratio in the automatic transmission of PATENT DOCUMENT 2. The gear step between the first gear and the second gear is then extremely higher than the gear steps between the other gears, thereby sacrificing proper gear steps (see the comparative example in FIG. 21).

A possible solution to this problem is, for example, to increase a final gear ratio to obtain required drive power and start-up acceleration while providing proper gear steps. A final gear ratio is the gear ratio of a final gear mechanism including a gear train ranging from an output gear of the automatic transmission to an input gear of a differential mechanism. In this case, however, the size of the input gear of the differential mechanism increases. In particular, an increase in the size of a drive unit degrades the mountability of the drive unit in an engine compartment in a front engine, front-wheel drive vehicle with a drive unit, in which a transverse automatic transmission and a differential mechanism are integrated.

In the automatic transmission of PATENT DOCUMENT 2, the direct drive may be set in a high gear of the sixth or higher gear. In PATENT DOCUMENT 2, there are ten possible combinations of engaging three of five frictional coupling elements C1, Ca, Cb, B1, and B2. In the one combination other than the combinations used in the first to eighth gears and the reverse gear, that is, the engagement of the clutch C1 and the brakes B1 and B2, the clutches Ca and Cb are disengaged. The carrier Cr of the planetary gear set 8 becomes free. That is, the torque cannot be output to a ring gear Rr of the planetary gear set 8, which is engaged with the output gear 3 such that the gear is neutral. The engagement of the clutch C1, and the brakes B1 and B2 cannot be used as a shift gear.

It is thus impossible in the automatic transmission of PATENT DOCUMENT 2 to place an additional gear (i.e., a underdrive gear) as a gear lower than the fifth gear to set the direct drive in the sixth or higher gear.

In the automatic transmission of PATENT DOCUMENT 2, assume that there is an attempt to set the direct drive in the sixth or higher gear by partially changing the engagements among the rotating elements of the gear sets, or the relations among the rotating elements and the frictional coupling elements. In an automatic transmission, such a partial change affects the other parts, and it is thus impossible to simply change one part. Eventually, an automatic transmission with a new configuration needs to be created from the beginning to provide a proper gear ratio in each gear stage and a proper gear step between each pair of successive gears using feasible sizes of gears.

The present invention was made in view of the problems. It is an objective of the present invention to provide an automatic transmission, which provides direct drive in the sixth gear and has a proper gear step between each pair of successive gears.

Solution to the Problem

In order to achieve the objectives, an aspect of the present invention provides an automatic transmission including in a transmission case, an input shaft engaged with a power source; an output arranged coaxially with the input shaft and engaged with a differential mechanism; a first planetary gear set being of a double pinion type, and including a first sun gear, a first carrier, and a first ring gear; a second planetary gear set being of the double pinion type, and including a second sun gear, a second carrier, and a second ring gear; a third planetary gear set being of a single pinion type, and including a third sun gear, a third carrier, and a third ring gear; a fourth planetary gear set being of the single pinion type, and including a fourth sun gear, a fourth carrier, and a fourth ring gear; a first clutch; a second clutch; a third clutch; a first brake; and a second brake. The input shaft, the second sun gear, and the fourth carrier are engaged. The output, the first ring gear, and the fourth ring gear are engaged. The first sun gear and the third ring gear are engaged. The second ring gear and the third carrier are engaged. The first clutch engages and disengages the second carrier with and from the third sun gear. The second clutch engages and disengages the third sun gear with and from the third ring gear. The third clutch engages and disengages the third sun gear with and from the fourth sun gear. The first brake engages and disengages the second carrier with and from the transmission case. The second brake engages and disengages the first carrier with and from the transmission case. A gear ratio of the automatic transmission is 1 in a sixth gear.

In the above-described configuration, the gear ratio of the automatic transmission is 1 (i.e., direct drive) in the sixth gear. The number of underdrive gears (i.e., the gears with gear ratios higher than 1) is thus larger than that of known automatic transmissions providing direct drive in the fifth gear.

As such, the gear ratios in the low gears (e.g., the first gear, the second gear, etc.) are increased without sacrificing proper gear steps. As a result, required drive power and start-up acceleration are available while setting a proper gear step between each pair of successive gears.

In particular, in the case where a transverse automatic transmission and a differential mechanism are integrated into a drive unit, and an input shaft of the automatic transmission is engaged with a small-displacement engine being a power source, there is no need to increase a final gear ratio. A final gear ratio is the gear ratio of a final gear mechanism including a gear train ranging from an output gear of the automatic transmission to an input gear of the differential mechanism. This prevents an increase in the size of the drive unit caused by an increase in the final gear ratio. It is thus possible to set a proper gear step between each pair of successive gears, and prevent degradation in the mountability of the drive unit in an engine compartment.

The above-described automatic transmission preferably provides eight forward gears and one reverse gear. The second clutch, the first brake, and the second brake are preferably engaged to provide a first gear. The first clutch, the first brake, and the second brake are preferably engaged to provide a second gear. The first clutch, the second clutch, and the second brake are preferably engaged to provide a third gear. The first clutch, the third clutch, and the second brake are preferably engaged to provide a fourth gear. The second clutch, the third clutch, and the second brake are preferably engaged to provide a fifth gear. The first clutch, the second clutch, and the third clutch are preferably engaged to provide a sixth gear. The second clutch, the third clutch, and the first brake are preferably engaged to provide a seventh gear. The first clutch, the third clutch, and the first brake are preferably engaged to provide an eighth gear. The third clutch, the first brake, and the second brake are preferably engaged to provide a reverse gear.

With this configuration, each of the first to fifth gears, the seventh gear, the eighth gear, and the reverse gear has a proper gear ratio by properly setting the number of the teeth of the sun gears and the ring gears of the planetary gear sets.

Advantages of the Invention

As described above, the automatic transmission according to the present invention provides the direct drive in the sixth gear, and properly sets the step-up ratio between each pair of successive gears, while providing required drive power and start-up acceleration.

BRIEF DESCRIPTION OF THE DRAWINGS

FIG. 2 is a logic table showing engagements of frictional coupling elements in gear stages of the automatic transmission.

FIG. 19 is a table showing example numbers of teeth of gears forming planetary gear sets.

FIG. 20 is a table showing gear ratios in gear stages and gear steps between successive gears, where the gears have the example numbers of teeth shown in FIG. 19.

DESCRIPTION OF EMBODIMENTS

Embodiments of the present invention will now be described with reference to the drawings.

Figure 1:
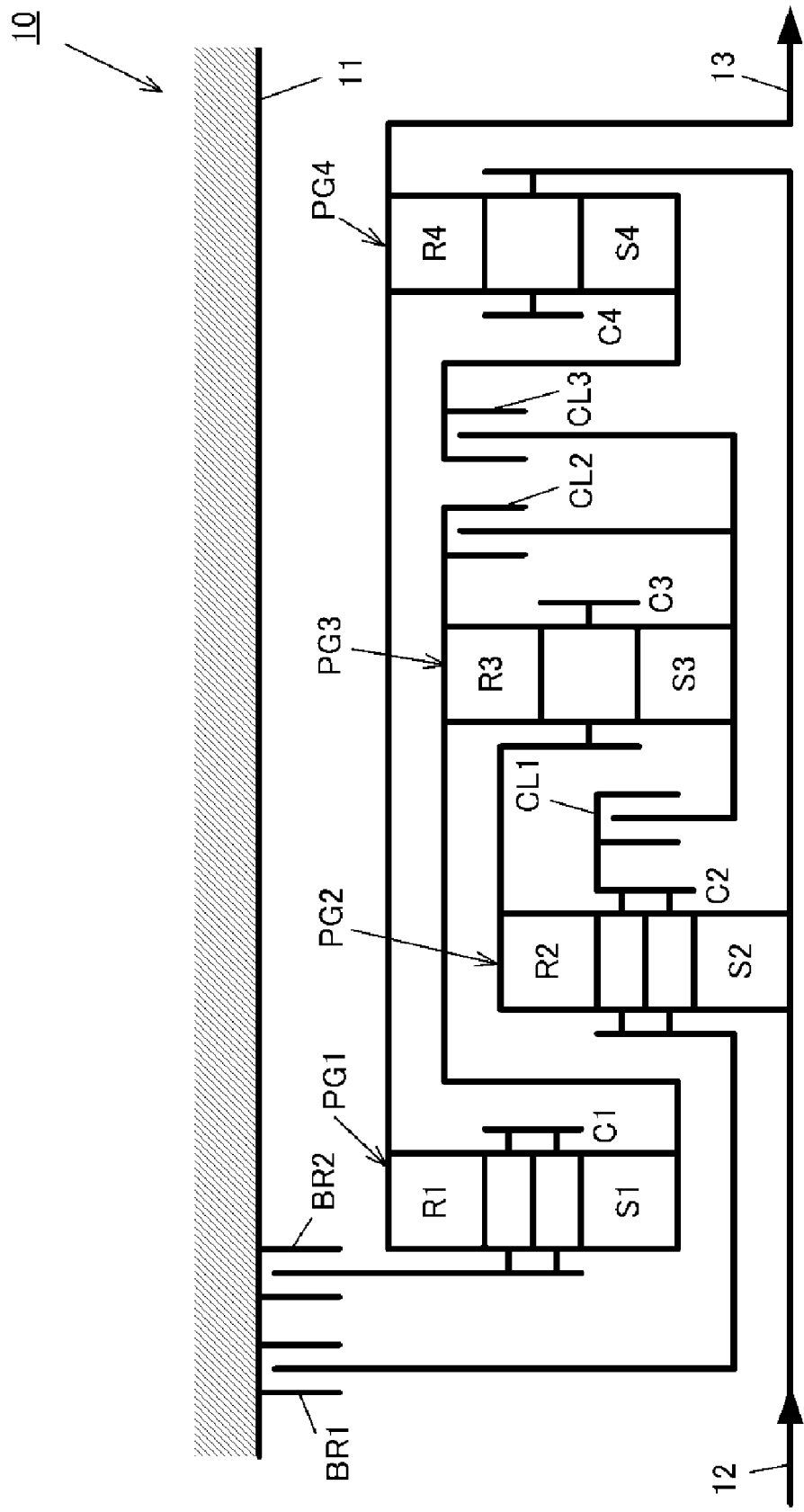
FIG. 1 is a skeleton diagram illustrating an automatic transmission according to a first embodiment of the present invention.

FIG. 1 illustrates an automatic transmission 10 according to a first embodiment of the present invention. This automatic transmission 10 is mounted in a vehicle, and provides eight forward gears and one reverse gear.

The automatic transmission 10 includes in a transmission case 11, an input shaft 12 and an output shaft (output) 13. The input shaft 12 is engaged with a power source such as an engine. The output shaft 13 is arranged coaxially with this input shaft 12, and engaged with a differential mechanism. The automatic transmission 10 is a longitudinal transmission, which is mounted in a vehicle such that the input shaft 12 and the output shaft 13 extend from the front to the rear of (longitudinally along) the vehicle. The end of the input shaft 12 at the front of the vehicle is engaged with the power source. The end of the output shaft 13 at the rear of the vehicle is engaged with the differential mechanism.

The transmission case 11 includes a first planetary gear set PG1 of a double pinion type (hereinafter simply referred to as a first gear set PG1), a second planetary gear set PG2 of the double pinion type (hereinafter simply referred to as a second gear set PG2), a third planetary gear set PG3 of a single pinion type (hereinafter simply referred to as a third gear set PG3), and a fourth planetary gear set PG4 of the single pinion type (hereinafter simply referred to as a fourth gear set PG4), which are arranged in this order from the input side (i.e., the power source side) on the left of FIG. 1. The gear sets are arranged coaxially with the input shaft 12.

The transmission case 11 includes five frictional coupling elements arranged coaxially with the input shaft 12. Specifically, a first clutch CL1 is placed between the second gear set PG2 and the third gear set PG3 along the input shaft. The second clutch CL2 and the third clutch CL3 are placed, in this order from the input side, between the third gear set PG3 and the fourth gear set PG4 along the input shaft. A first brake BR1 and a second brake BR2 are placed, in this order from the input side, at the input side of the first gear set PG1.

Each of the first to fourth gear sets PG1-PG4 includes three rotating elements. Specifically, the first gear set PG1 includes, as rotating elements, a first sun gear S1, a first ring gear R1, and a first carrier C1. The second gear set PG2 includes, as rotating elements, a second sun gear S2, a second ring gear R2, and a second carrier C2. The third gear set PG3 includes, as rotating elements, a third sun gear S3, a third ring gear R3, and a third carrier C3. The fourth gear set PG4 includes, as rotating elements, a fourth sun gear S4, a fourth ring gear R4, and a fourth carrier C4.

The first gear set PG1 of the double pinion includes a plurality of first pinions and a plurality of second pinions. The first pinions are engaged with the first sun gear S1. Each second pinion is engaged with one of the first pinions, and the first ring gear R1. These first and second pinions are supported by the first carrier C1. Similar to the first gear set PG1, the second gear set PG2 of the double pinion includes a plurality of first pinions and a plurality of second pinions. The first pinions are engaged with the second sun gear S2. Each second pinion is engaged with one of the first pinions, and the second ring gear R2. These first and second pinions are supported by the second carrier C2. The third gear set PG3 of the single pinion type includes a plurality of pinions engaged with the third sun gear S3 and the third ring gear R3. The pinions are supported by the third carrier C3. Similar to the third gear set PG3, the fourth gear set PG4 of the single pinion type includes a plurality of pinions engaged with the fourth sun gear S4 and the fourth ring gear R4. The pinions are supported by the fourth carrier C4.

In the automatic transmission 10, the first sun gear S1 and the third ring gear R3 are normally engaged, the first ring gear R1 and the fourth ring gear R4 are normally engaged, the second sun gear S2 and the fourth carrier C4 are normally engaged, and the second ring gear R2 and the third carrier C3 are normally engaged. The input shaft 12 is normally engaged with the second sun gear S2 and the fourth carrier C4. The output shaft 13 is normally engaged with the first ring gear R1 and the fourth ring gear R4.

The first clutch CL1 engages and disengages the second carrier C2 with and from the third sun gear S3. The second clutch CL2 engages and disengages the third sun gear S3 with and from the third ring gear R3. The third clutch CL3 engages and disengages the third sun gear S3 with and from the fourth sun gear S4.

The first brake BR1 engages and disengages the transmission case 11 with and from the second carrier. The second brake BR2 engages and disengages the transmission case 11 with and from the first carrier C1.

As shown in an engagement logic table of FIG. 2, the automatic transmission 10 with the above-described configuration selectively engages three of the five frictional coupling elements to provide first to eighth forward gears and a reverse gear. In the engagement logic table of FIG. 2, circled cells represent engagements of the frictional coupling elements, and blank cells represent disengagements of the frictional coupling elements.

Next, a mechanism for determining the gear ratio of the automatic transmission 10 in each gear stage will be described based on the combination of the frictional coupling elements shown in FIG. 2.

Figure 3A:
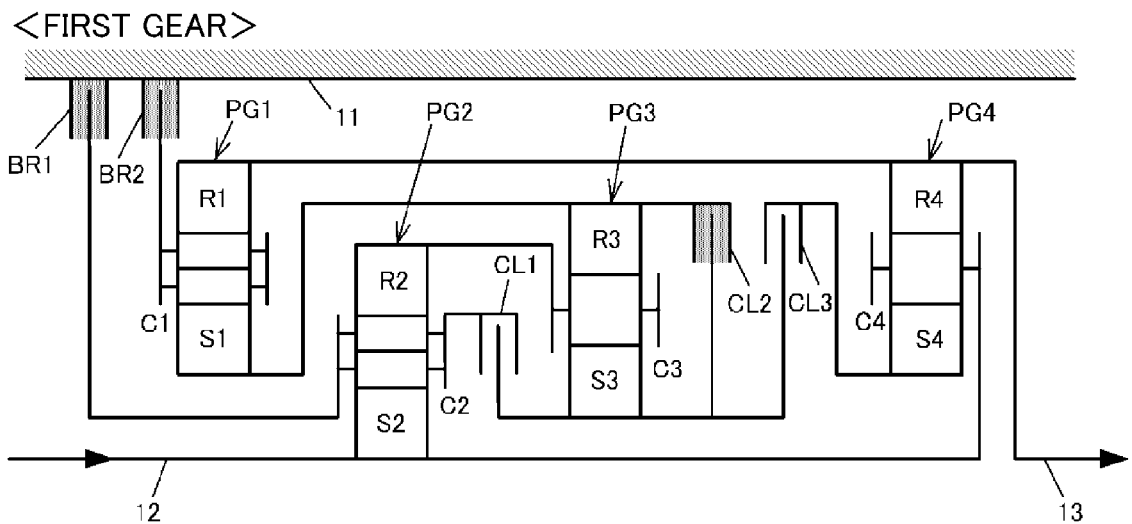
FIG. 3A is a skeleton diagram illustrating the engagement of the frictional coupling elements in a first gear.
Figure 3B:
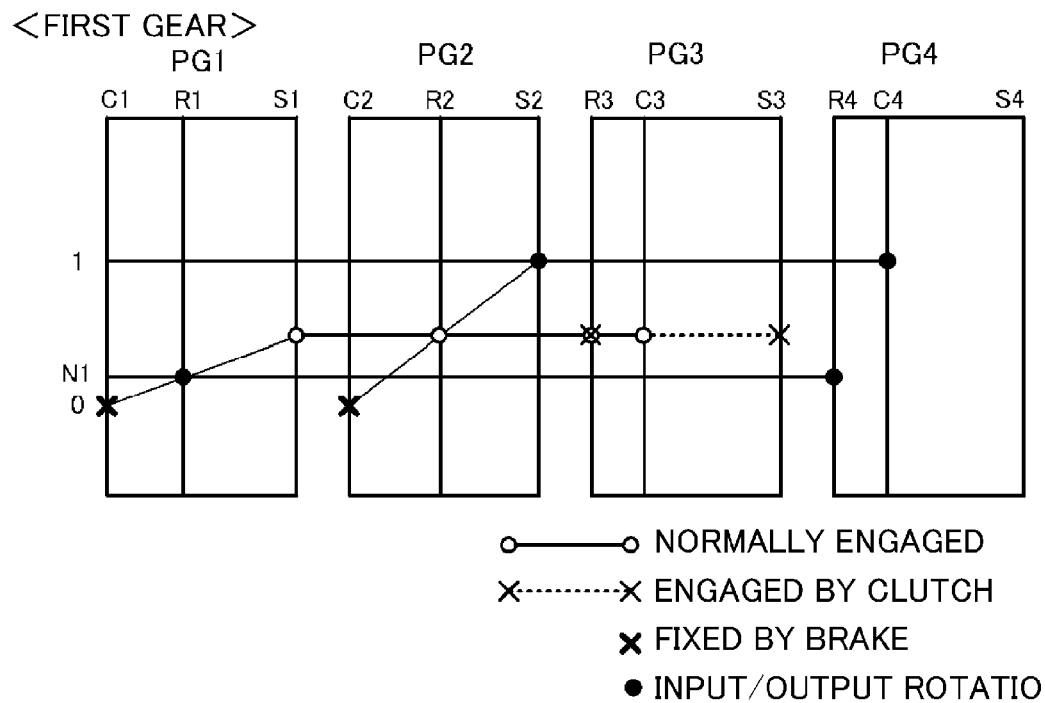
FIG. 3B is a gear ratio diagram of the first gear.
Figure 4A:
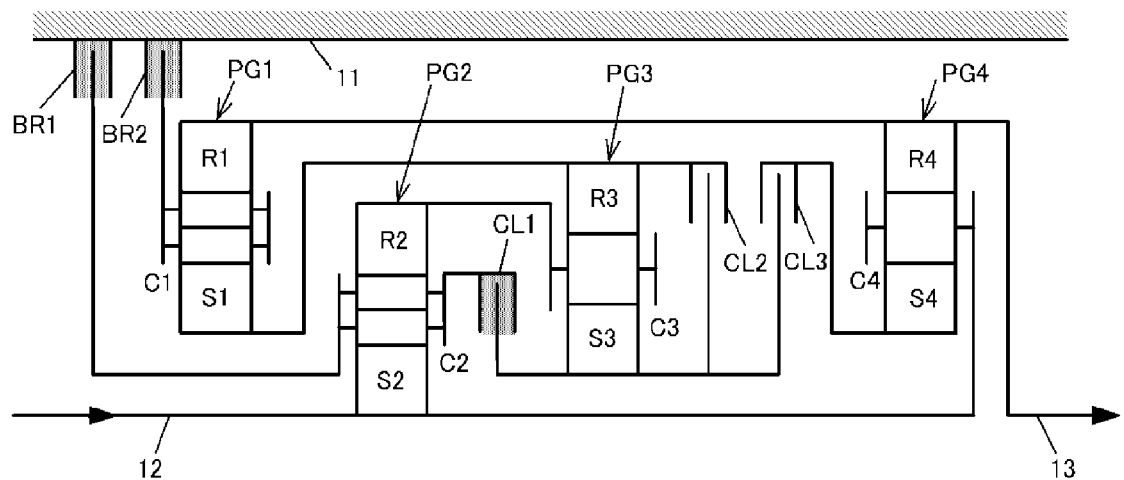
FIG. 4A is a skeleton diagram illustrating the engagement of the frictional coupling elements in a second gear.
Figure 4B:
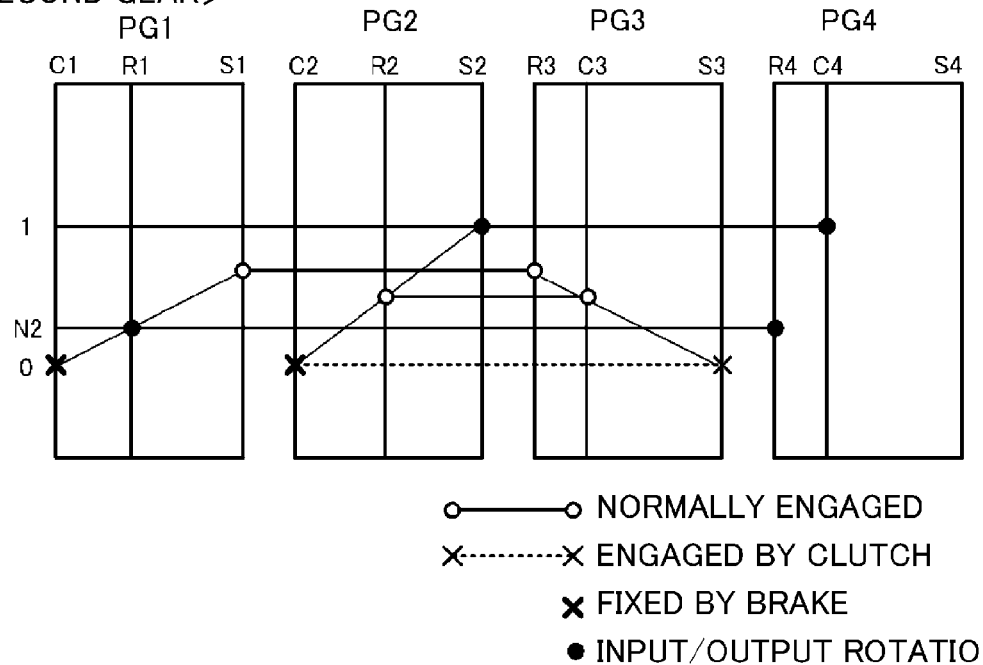
FIG. 4B is a gear ratio diagram of the second gear.

FIGS. 3A, 4A, ..., and 11A are skeleton diagram, each of which illustrates the engagement of the frictional coupling elements in a gear stage. In each figure, the engaged frictional coupling elements are shaded. FIGS. 3B, 4B, ..., and 11B are gear ratio diagrams in the gear stages, and correspond to FIGS. 3A, 4A, ..., and 11A, respectively. In each gear ratio diagram, the lateral distance between each pair of the rotating elements of the gear sets PG1-PG4 is determined by the gear ratio. In the first and second gear sets PG1 and PG2 of the double pinion type, the carrier, the ring gear, and the sun gear are arranged in this order. In the third and fourth gear sets PG3 and PG4 of the single pinion type, the ring gear, the carrier, and the sun gear are arranged in this order.

In each gear ratio diagram, the ordinate represents a rotational speed. An input rotational speed, that is, the rotational speed of the input shaft 12 as well as the second sun gear S2 and the fourth carrier C4, which are normally engaged with the input shaft 12, is 1. The rotational speed of the rotating elements fixed by the brakes is 0. The rotational speeds of the normally engaged rotating elements are equal. The rotational speeds of the rotating elements engaged by the clutches are equal. N1-N8 and Nr denote output rotational speeds in the gear stages, that is, the rotational speed of the first and fourth ring gears R1 and R4 (the rotational speed of the output shaft 13). Since the input rotational speed is 1, the reciprocal number of this output rotational speed is the gear ratio of the automatic transmission 10 in the gear stage.

In the first gear, as shown in FIGS. 3A and 3B, the second clutch CL2, the first brake BR1, and the second brake BR2 are engaged. Thus, the rotational speed of the first carrier C1 and the second carrier C2 is 0. At the same time, the third sun gear S3 and the third ring gear R3 are integrated into the whole third gear set PG3, thereby rotating all the rotating elements of the third gear set PG3 together. The second ring gear R2, which is normally engaged with the third carrier C3, and the first sun gear S1, which is normally engaged with the third ring gear R3, rotate together with these rotating elements.

The rotational speed of these rotating elements is determined in the second gear set PG2 on the presupposition that the rotational speed of the second sun gear S2 is 1, and the rotational speed of the second carrier C2 is 0. The determined rotational speed is input to the first sun gear S1 of the first gear set PG1. The rotational speed of the first ring gear R1 is then determined on the presupposition that the rotational speed of the first carrier C1 is 0. The determined rotational speed is an output rotational speed N1 in the first gear.

In the second gear, as shown in FIGS. 4A and 4B, the first clutch CL1, the first brake BR1, and the second brake BR2 are engaged. Thus, the rotational speed of the first carrier C1 and the second carrier C2 is 0. At the same time, since the second carrier C2 and the third sun gear S3 are engaged, the rotational speed of the third sun gear S3 is also 0.

The rotational speed of the second ring gear R2 as well as the third carrier C3, which is normally engaged with the second ring gear R2, is determined on the presupposition that the rotational speed of the second sun gear S2 is 1, and the rotational speed of the second carrier C2 is 0. Then, the rotational speed of the third ring gear R3 as well as the first sun gear S1, which is normally engaged with the third ring gear R3, is determined on the presupposition that the rotational speed of the third sun gear S3 is 0. As a result, the rotational speed of the first ring gear R1 is determined in the first gear set PG1 on the presupposition that the rotational speed of the first carrier C1 is 0. The determined rotational speed is an output rotational speed N2 in the second gear.

Figure 5A:
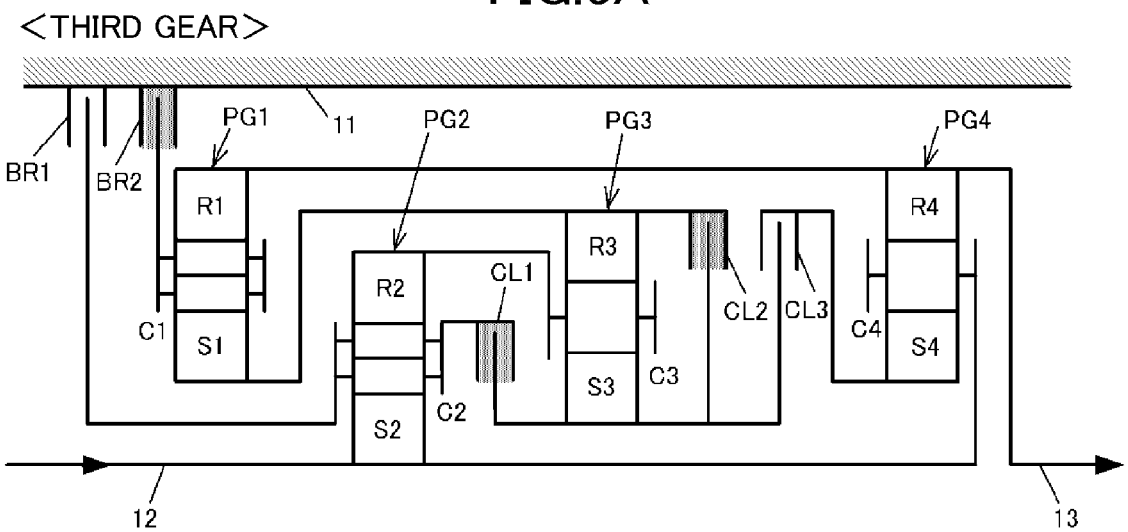
FIG. 5A is a skeleton diagram illustrating the engagement of the frictional coupling elements in a third gear.
Figure 5B:
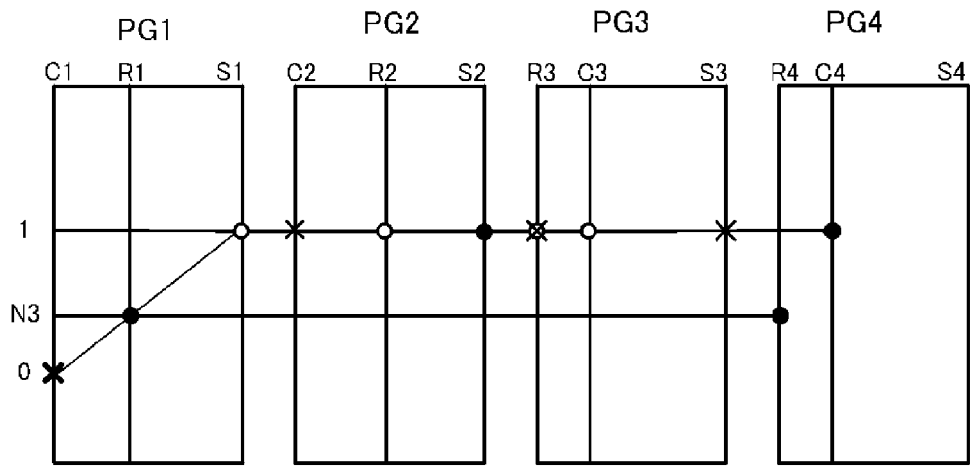
FIG. 5B is a gear ratio diagram of the third gear.

In the third gear, as shown in FIGS. 5A and 5B, the first clutch CL1, the second clutch CL2, and the second brake BR2 are engaged. The engagement of the second clutch CL2 integrates the third sun gear S3 and the third ring gear R3 into the whole third gear set PG3, thereby rotating all the rotating elements of the third gear set PG3 together. The second ring gear R2, which is normally engaged with the third carrier C3, and the first sun gear S1, which is normally engaged with the third ring gear R3, rotate together with these rotating elements.

The third sun gear S3 and the second carrier C2 are engaged to provide the integrated second gear set PG2. As a result, all the rotating elements of the second and third gear sets PG2 and PG3 rotate together at the rotational speed 1, which is input to the second sun gear S2.

This rotational speed 1 is transmitted to the first sun gear S1 of the first gear set PG1, in which the first carrier C1 rotates at the rotational speed 0, thereby determining the rotational speed of the first ring gear R1. The determined rotational speed is an output rotational speed N3 in the third gear.

Figure 6A:
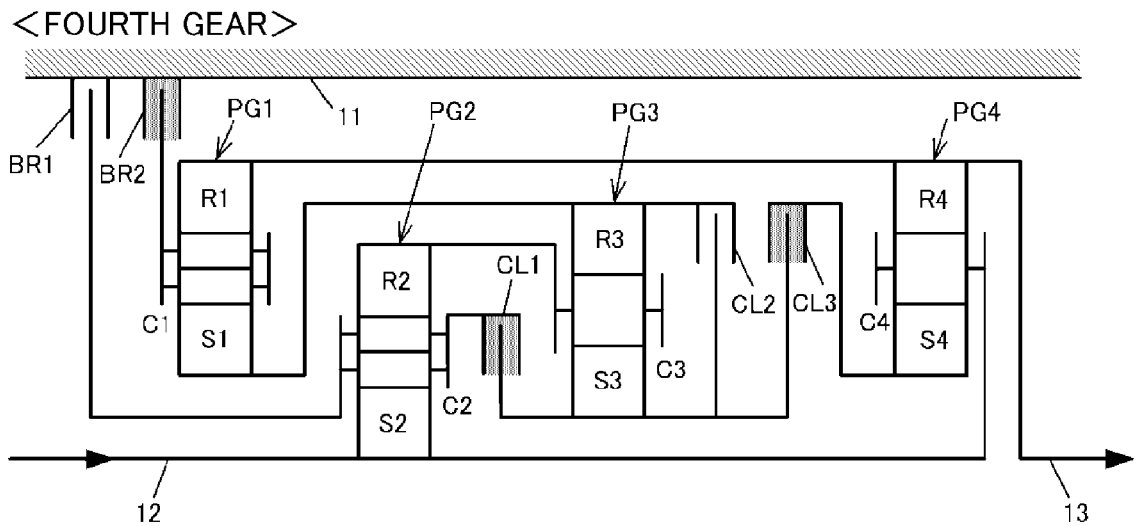
FIG. 6A is a skeleton diagram illustrating the engagement of the frictional coupling elements in a fourth gear.
Figure 6B:
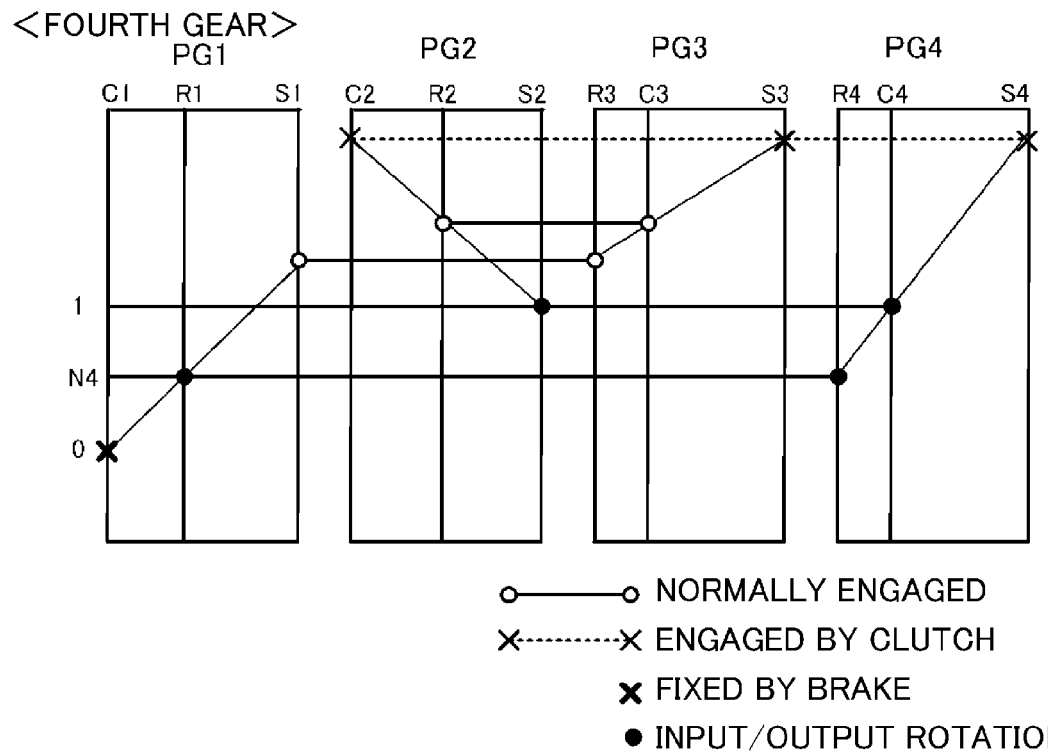
FIG. 6B is a gear ratio diagram of the fourth gear.

In the fourth gear, as shown in FIGS. 6A and 6B, the first clutch CL1, the third clutch CL3, and the second brake BR2 are engaged. Thus, the rotational speed of the first carrier C1 is 0. At the same time, the second carrier C2, the third sun gear S3, and the fourth sun gear S4 are engaged and rotate together.

The rotational speed of the first ring gear R1 and the fourth ring gear R4 is determined on the above presuppositions and the following presuppositions: the first sun gear S1 and the third ring gear R3 are normally engaged; the second ring gear R2 and the third carrier C3 are normally engaged; the second sun gear S2 and the fourth carrier C4 are normally engaged, which are input rotating elements rotating at the rotational speed 1; and the first ring gear R1 and the fourth ring gear R4 are normally engaged. The determined rotational speed is an output rotational speed N4 in the fourth gear.

Figure 7A:
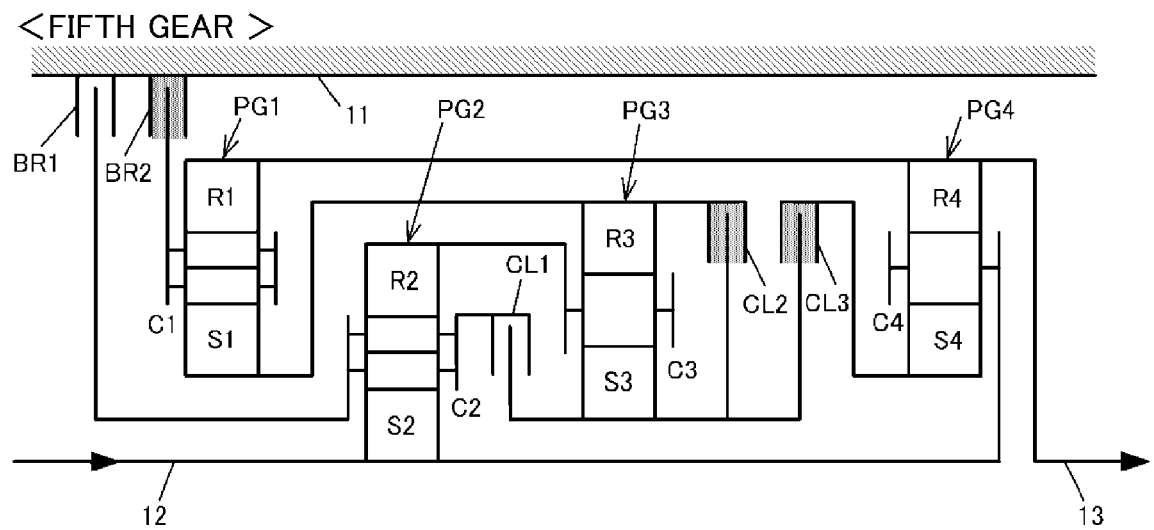
FIG. 7A is a skeleton diagram illustrating the engagement of the frictional coupling elements in a fifth gear.
Figure 7B:
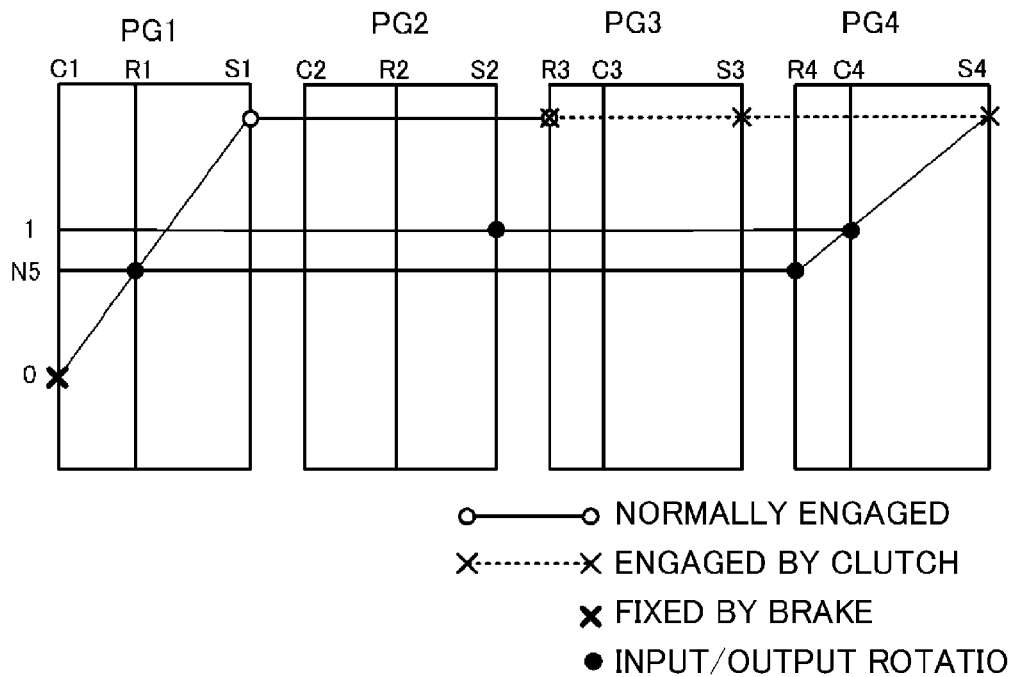
FIG. 7B is a gear ratio diagram of the fifth gear.

In the fifth gear, as shown in FIGS. 7A and 7B, the second clutch CL2, the third clutch CL3, and the second brake BR2 are engaged. The engagement of the second clutch CL2 integrates the third sun gear S3 and the third ring gear R3 into the whole third gear set PG3, thereby rotating all the rotating elements of the third gear set PG3 together. The first sun gear S1, which is normally engaged with the third ring gear R3, and the fourth sun gear S4, which is engaged with the third sun gear S3, rotate together with these rotating elements.

As a result, the rotational speed of the first ring gear R1 and the fourth ring gear R4 is determined in the first gear set PG1 and the fourth gear set PG4 on the following presuppositions: the first sun gear S1 and the fourth sun gear S4 rotate together; the first ring gear R1 and the fourth ring gear R4, which are normally engaged, rotate together; the rotational speed of the first carrier C1 is 0; and the rotational speed of the fourth carrier is 1. The determined rotational speed is an output rotational speed N5 in the fifth gear.

Figure 8A:
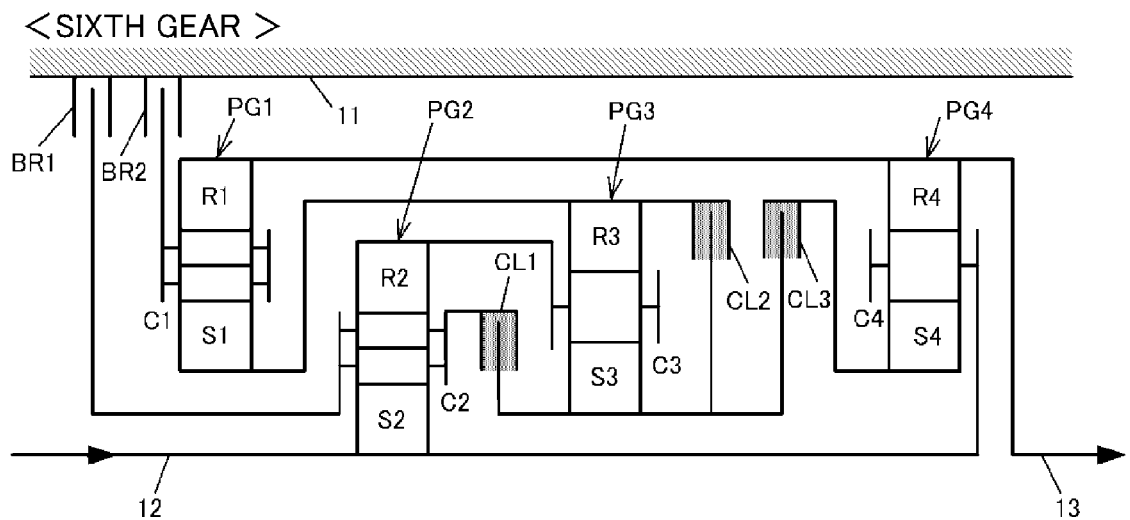
FIG. 8A is a skeleton diagram illustrating the engagement of the frictional coupling elements in a sixth gear.
Figure 8B:
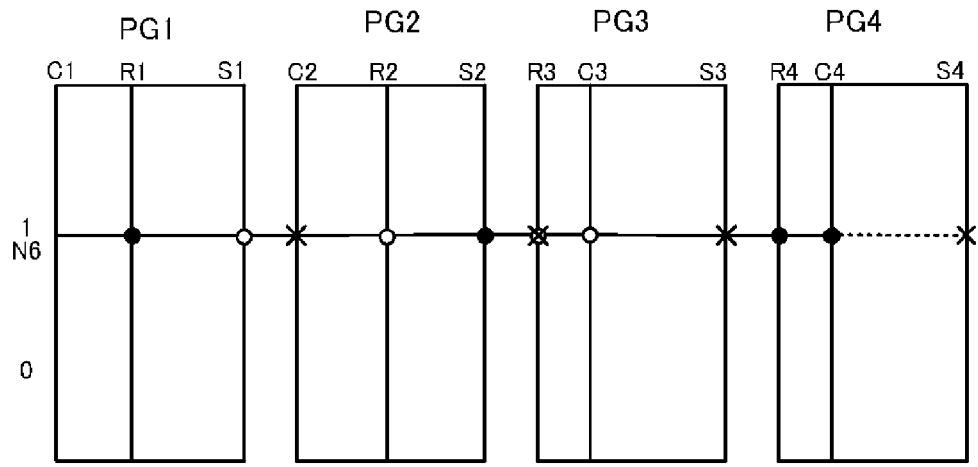
FIG. 8B is a gear ratio diagram of the sixth gear.

In the sixth gear, as shown in FIGS. 8A and 8B, the first clutch CL1, the second clutch CL2 and the third clutch CL3 are engaged. The engagement of the second clutch CL2 integrates the third sun gear S3 and the third ring gear R3 into the whole third gear set PG3, thereby rotating all the rotating elements of the third gear set PG3 together. The second ring gear R2, which is normally engaged with the third carrier C3, and the first sun gear S1, which is normally engaged with the third ring gear R3, rotate together with these rotating elements. In addition, the fourth sun gear S4, which is engaged with the third sun gear S3, rotates together.

The third sun gear S3 and the second carrier C2 are engaged to provide the integrated second gear set PG2. Then, all the rotating elements of the second gear set rotate together. The fourth carrier C4, which is normally engaged with the second sun gear S2, rotates together. As a result, the integrated fourth gear set PG4 is provided. The fourth ring gear R4, and the first ring gear R1, which is normally engaged with the fourth ring gear R4, rotate together with the rotating elements. As a result, the integrated first gear set PG1 is provided. As such, the first to fourth gear sets PG1-PG4 are integrated to rotate all the rotating elements at the same rotational speed.

Accordingly, the rotational speed 1 input to the second sun gear S2 and the fourth carrier C4 is unchanged output, as an output rotational speed N6 in the sixth gear, from the first and fourth ring gears R1 and R4 (the output shaft 13). The direct drive (i.e., the gear ratio is 1) is thus provided in the sixth gear.

Figure 9A:
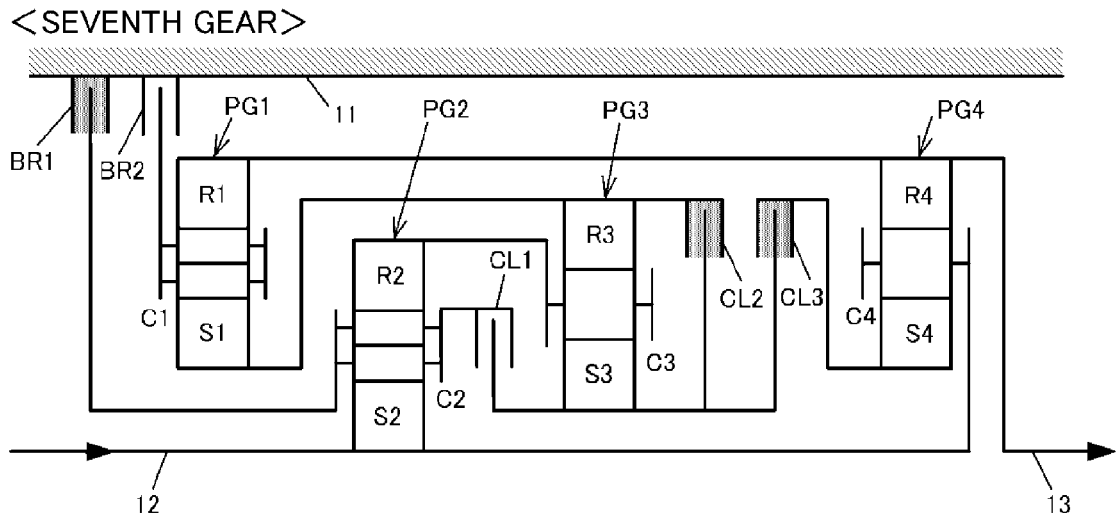
FIG. 9A is a skeleton diagram illustrating the engagement of the frictional coupling elements in a seventh gear.
Figure 9B:
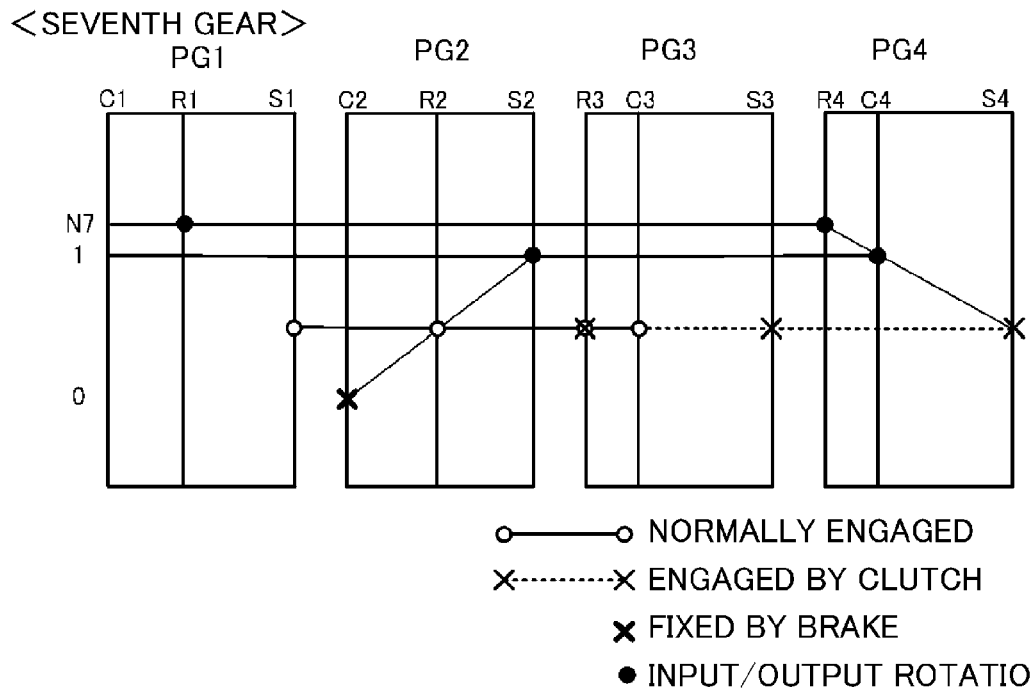
FIG. 9B is a gear ratio diagram of the seventh gear.

In the seventh gear, as shown in FIGS. 9A and 9B, the second clutch CL2, the third clutch CL3 and the first brake BR1 are engaged. The engagement of the second clutch CL2 integrates the third sun gear S3 and the third ring gear R3 into the whole integrated third gear set PG3, thereby rotating all the rotating elements of the third gear set PG3 together. The second ring gear R2, which is normally engaged with the third carrier C3, and the first sun gear S1, which is normally engaged with the third ring gear R3, rotate together with these rotating elements. In addition, the fourth sun gear S4, which is engaged with the third sun gear S3, rotates together.

The rotational speed of the rotating elements, which rotate together, is determined on the above presupposition, and the presupposition that the rotational speed of the second carrier C2 is 0, and the rotational speed of the second sun gear S2 and the fourth carrier C4 is 1. Accordingly, the rotational speed of the fourth ring gear R4 is determined. The determined rotational speed is an output rotational speed N7 in the seventh gear.

Figure 10A:
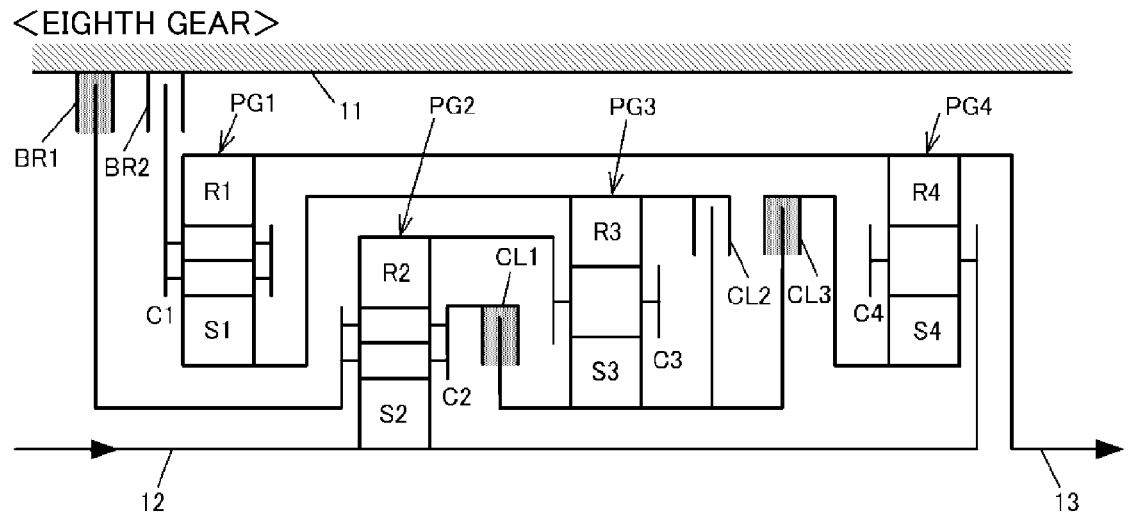
FIG. 10A is a skeleton diagram illustrating the engagement of the frictional coupling elements in an eighth gear.
Figure 10B:
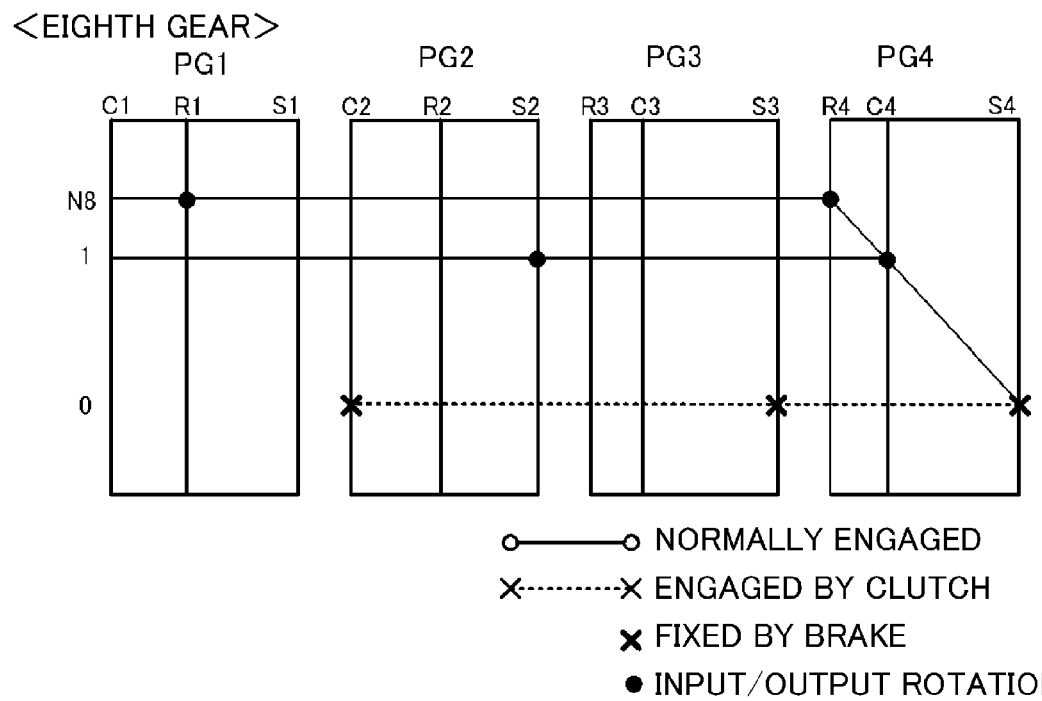
FIG. 10B is a gear ratio diagram of the eighth gear.

In the eighth gear, as shown in FIGS. 10A and 10B, the first clutch CL1, the third clutch CL3, and the first brake BR1 are engaged. Thus, the rotational speed of the second carrier C2 is 0. The rotational speed of the third sun gear S3 and the fourth sun gear S4, which are engaged with the second carrier C2, is also 0.

The rotational speed of the fourth ring gear R4 is determined in the fourth gear set PG4 on the presupposition that the rotational speed of the fourth carrier C4 is 1, and the rotational speed of the fourth sun gear S4 is 0. The determined rotational speed is an output rotational speed N8 in the eighth gear.

Figure 11A:
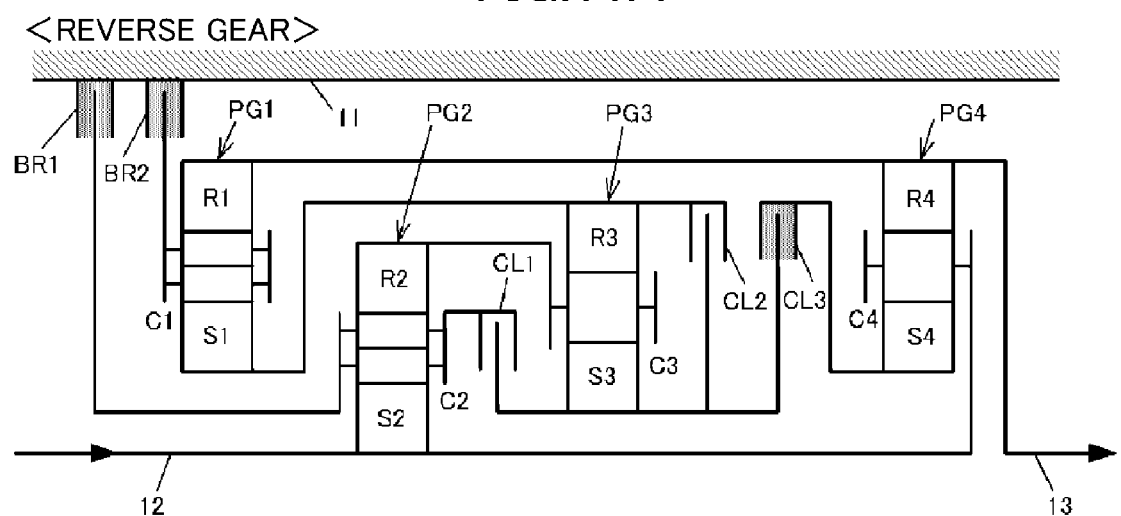
FIG. 11A is a skeleton diagram illustrating the engagement of the frictional coupling elements in a reverse gear.
Figure 11B:
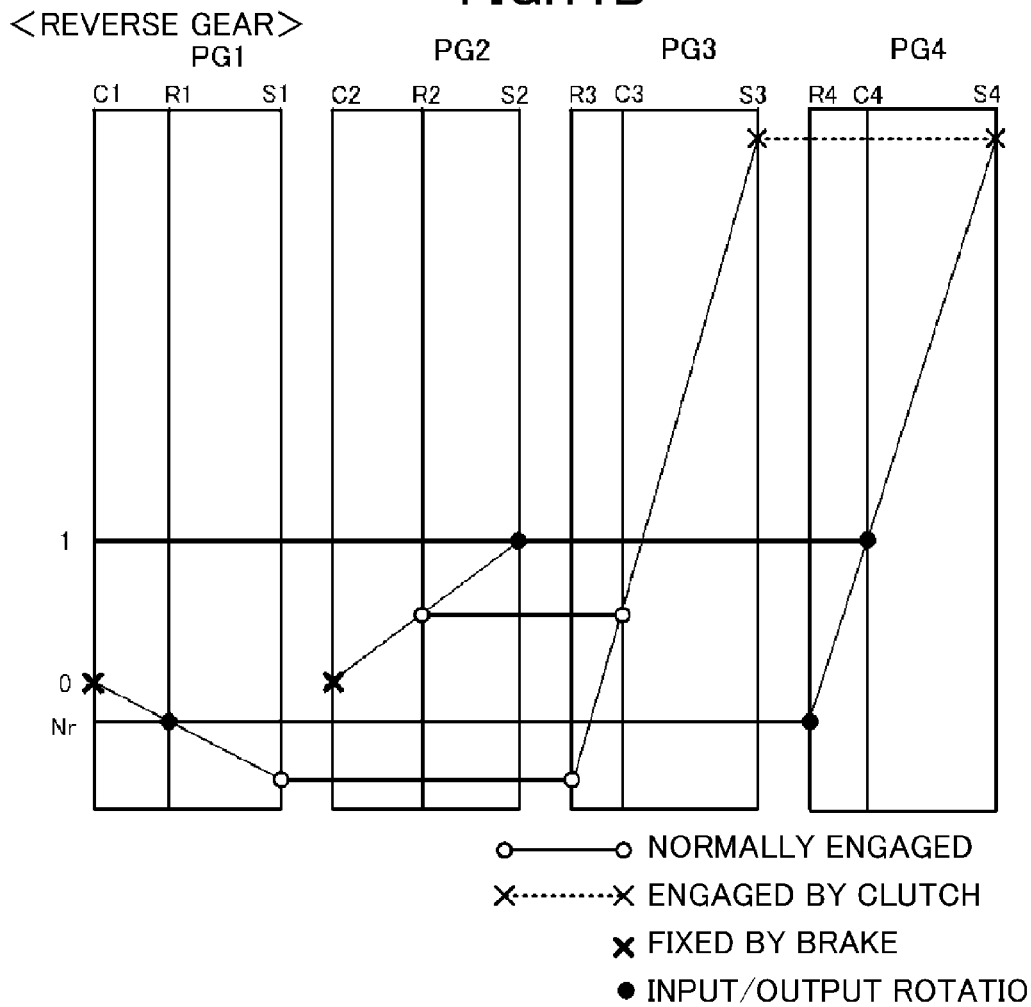
FIG. 11B is a gear ratio diagram of the reverse gear.

In the reverse gear, as shown in FIGS. 11A and 11B, the third clutch CL3, the first brake BR1, and the second brake BR2 are engaged. Thus, the third sun gear S3 and the fourth sun gear S4 are engaged and rotate together. The rotational speed of the first and second carriers C1 and C2 is 0.

The output rotational speed of the first ring gear R1 and the fourth ring gear R4 is determined on the above presuppositions and the following presuppositions: the first sun gear S1 and the third ring gear R3 are normally engaged; the second ring gear R2 and the third carrier C3 are normally engaged; the second sun gear S2 and the fourth carrier C4 are normally engaged, which are the input rotating elements rotating at the rotational speed 1; and the first ring gear R1 and the fourth ring gear R4 are normally engaged. The determined output rotational speed is an output rotational speed Nr in the reverse gear, where the vehicle travels in the direction opposite to the forward direction.

As described above, the engagement combinations of the frictional coupling elements shown in FIG. 2 make the rotational speeds N1-N8, and Nr satisfy $0<N1<N2<N3<N4<N5<N6<N7<N8$, and $Nr<0$. With the above-described configuration, the output rotational speed N6 of the sixth gear is equal to the input rotational speed. As a result, the automatic transmission 10 has a gear ratio of 1 in the sixth gear, and eight forward gears and one reverse gear.

In the automatic transmission 10 which provides the direct drive in the sixth gear, the number of underdrive gears (i.e., the gears with gear ratios higher than 1) is larger than that in the automatic transmission which provides the direct drive in the fifth gear. This increases the gear ratios in the low gears (e.g., the first gear, the second gear, etc.) without sacrificing proper gear steps. As a result, required drive power and start-up acceleration are available, while setting a proper gear step between each pair of successive gears.

Now, automatic transmissions 20-80 according to second to eighth embodiments shown in FIGS. 12-18, respectively, will be described.

Similar to the automatic transmission 10, each of the automatic transmissions 20, 30, 40, 50, 60, 70, and 80 is mounted in a vehicle, and provides eight forward gears and one reverse gear. Each transmission includes, in a transmission case, an input shaft, an output, first and second gear sets of a double pinion type, third and fourth gear sets of a single pinion type, and frictional coupling elements (e.g., first to third clutches as well as first and second brakes). The input shaft is engaged with a power source. The output is arranged coaxially with the input shaft and engaged with a differential mechanism. The first and second gear sets are arranged coaxially with the input shaft. The third and fourth gear sets are arranged coaxially with the input shaft. The frictional coupling elements are arranged coaxially with the input shaft.

In FIGS. 12-18, the same reference characters as those shown in FIG. 1 are used to represent first to fourth gear sets and rotating elements thereof, as well as frictional coupling elements.

In the second to eighth embodiments, the first to fourth gear sets are arranged, along the input shaft, in different orders from that of the first embodiment. Accordingly, the arrangements of the frictional coupling elements are different. Other configurations are the same as those in the first embodiment.

Figure 12:
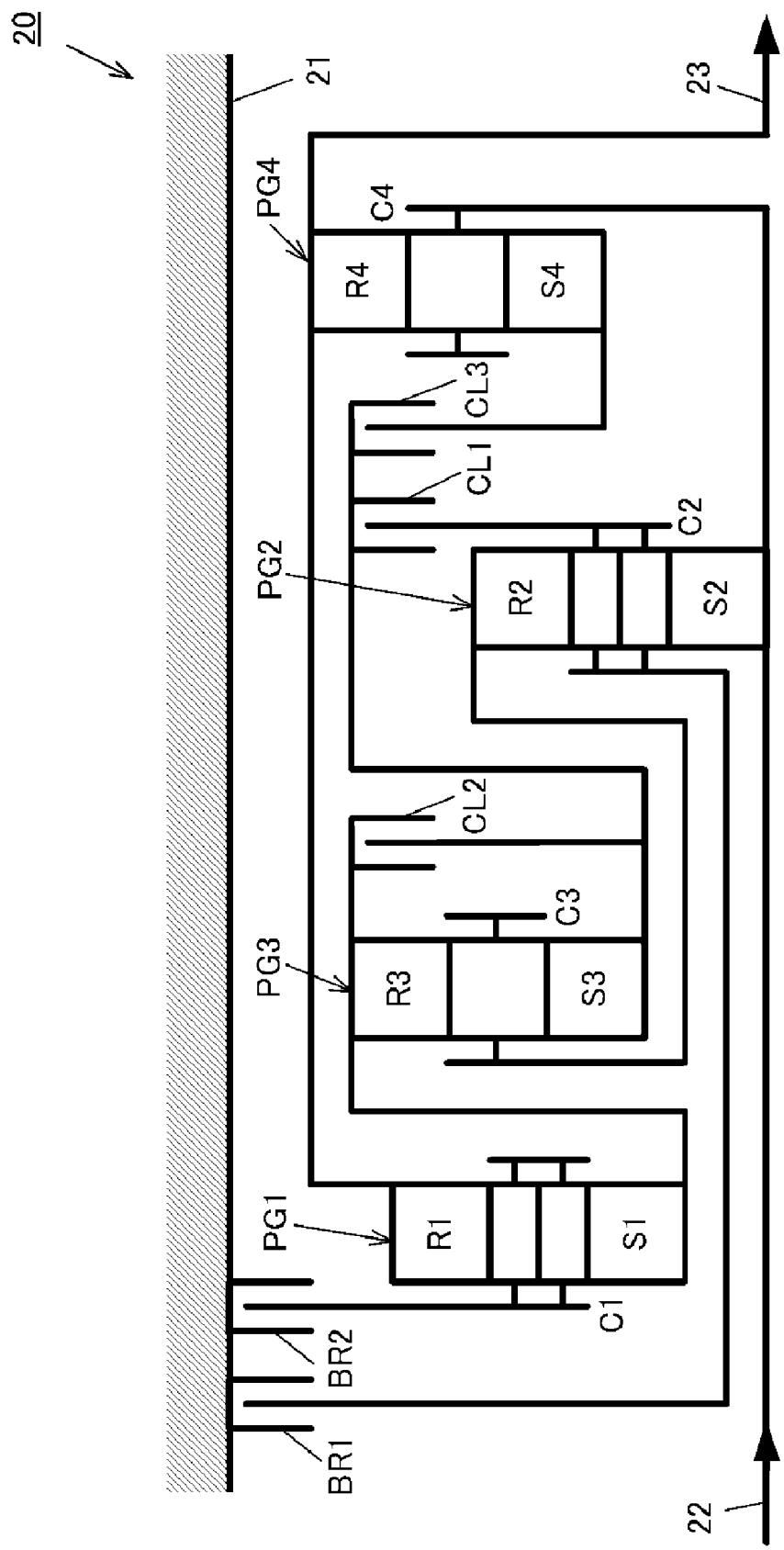
FIG. 12 is a skeleton diagram of an automatic transmission according to a second embodiment.

In the automatic transmission 20 according to the second embodiment shown in FIG. 12, a first gear set PG1, a third gear set PG3, a second gear set PG2, and a fourth gear set PG4 are arranged in this order from the input side in a transmission case 21. The gear sets are arranged coaxially with an input shaft 22 (and an output shaft 23).

A second clutch CL2 is placed between the third gear set PG3 and the second gear set PG2 along the input shaft. A first clutch CL1 and a third clutch CL3 are placed, in this order from the input side, between the second gear set PG2 and the fourth gear set PG4 along the input shaft. A first brake BR1 and a second brake BR2 are placed, in this order from the input side, at the input side of the first gear set PG1.

Figure 13:
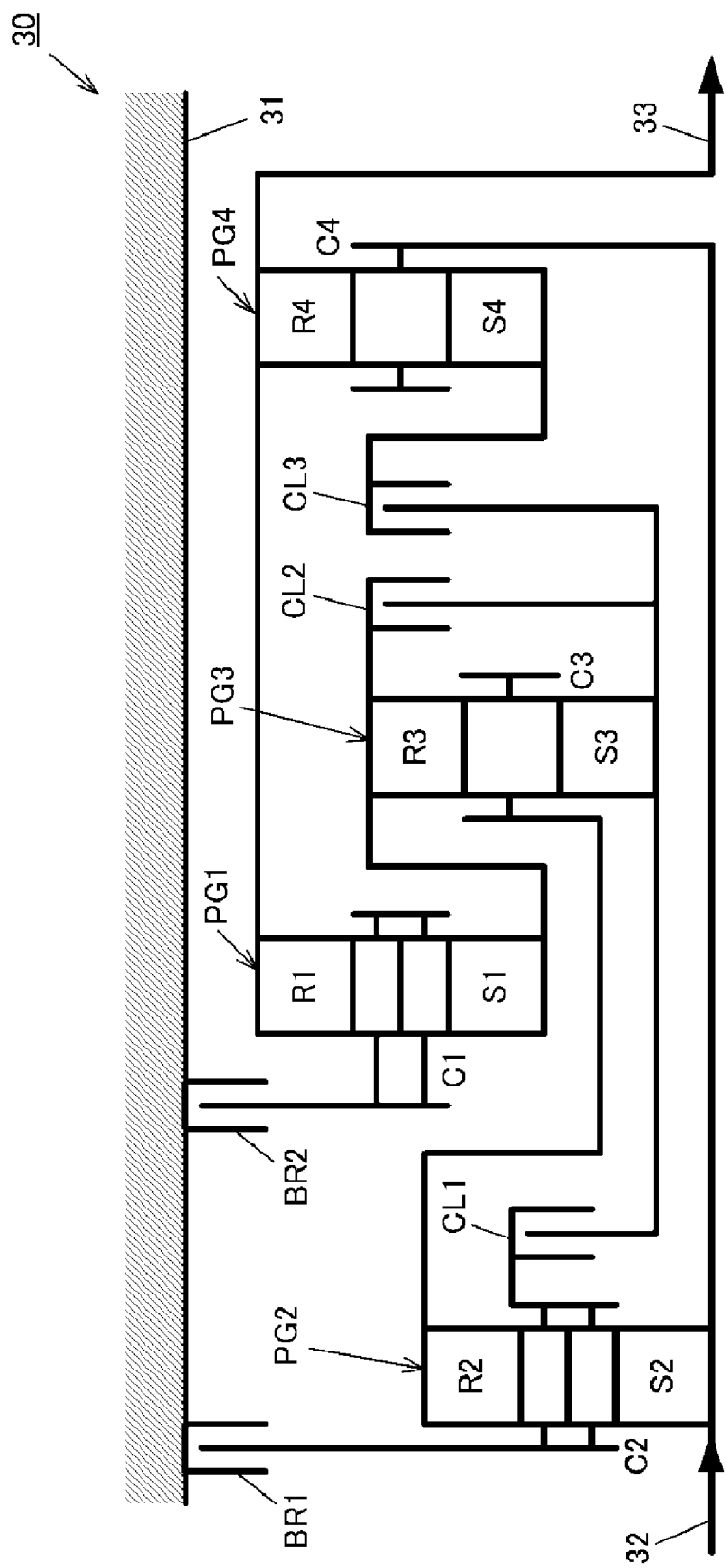
FIG. 13 is a skeleton diagram of an automatic transmission according to a third embodiment.

In the automatic transmission 30 according to the third embodiment shown in FIG. 13, a second gear set PG2, a first gear set PG1, a third gear set PG3, and a fourth gear set PG4 are arranged in this order from the input side in a transmission case 31. The gear sets are arranged coaxially with an input shaft 32 (and an output shaft 33).

A first clutch CL1 is placed between the second gear set PG2 and the first gear set PG1 along the input shaft. A second clutch CL2 and a third clutch CL3 are placed, in this order from the input side, between the third gear set PG3 and the fourth gear set PG4 along the input shaft. A first brake BR1 is placed near the input side of the second gear set PG2. A second brake BR2 is placed between the first clutch CL1 and the first gear set PG1 along the input shaft.

Figure 14:
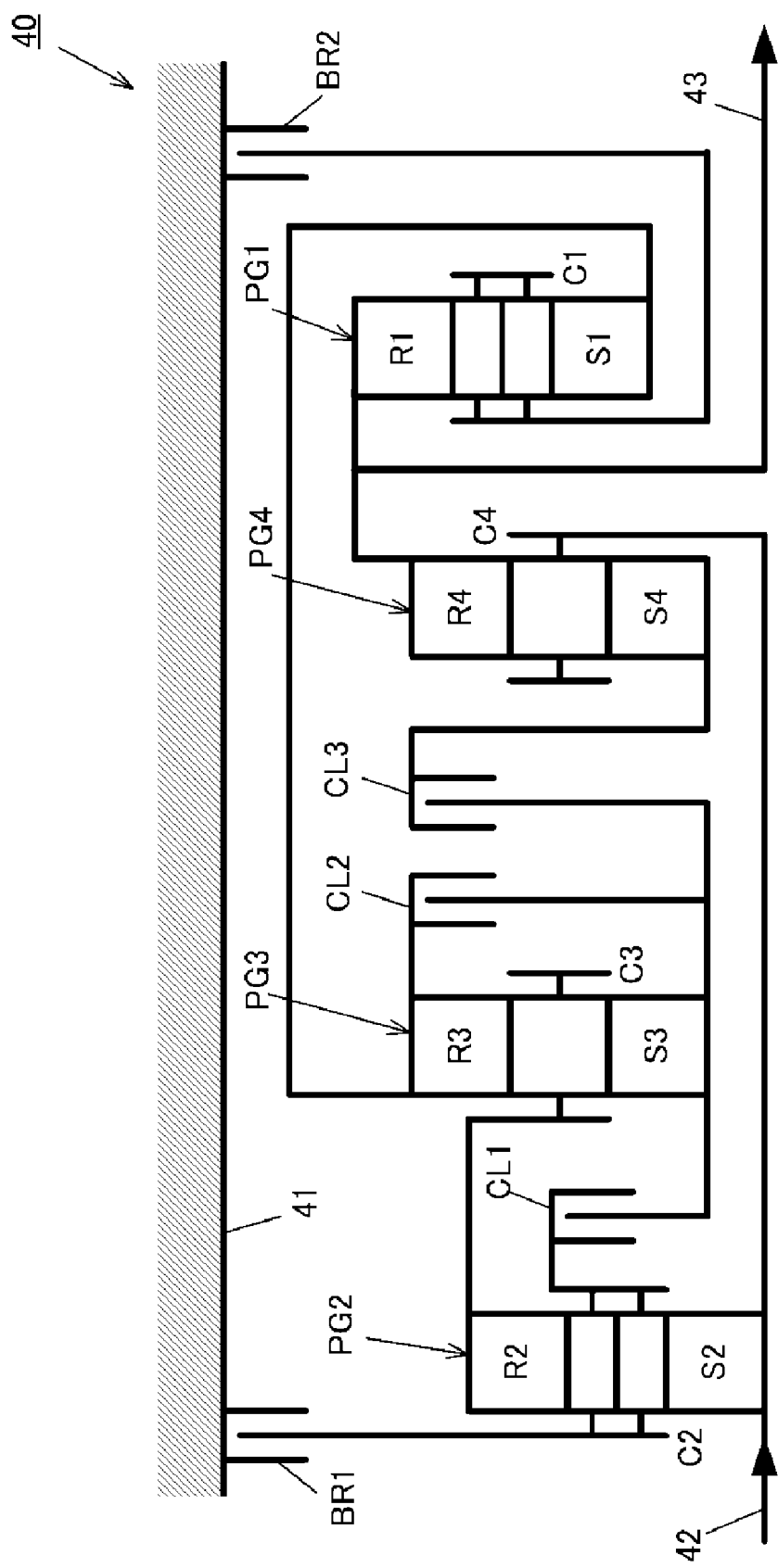
FIG. 14 is a skeleton diagram of an automatic transmission according to a fourth embodiment.

In the automatic transmission 40 according to the fourth embodiment shown in FIG. 14, a second gear set PG2, a third gear set PG3, a fourth gear set PG4, and a first gear set PG1 are arranged in this order from the input side in a the transmission case 41. The gear sets are arranged coaxially with an input shaft 42 (and an output shaft 43).

A first clutch CL1 is placed between the second gear set PG2 and the third gear set PG3 along the input shaft. A second clutch CL2 and a third clutch CL3 are placed, in this order from the input side, between the third gear set PG3 and the fourth gear set PG4 along the input shaft. A first brake BR1 is placed near the input side of the second gear set PG2. A second brake BR2 is placed near the side of the first gear set PG1 opposite to the input side (i.e., the output side).

Figure 15:
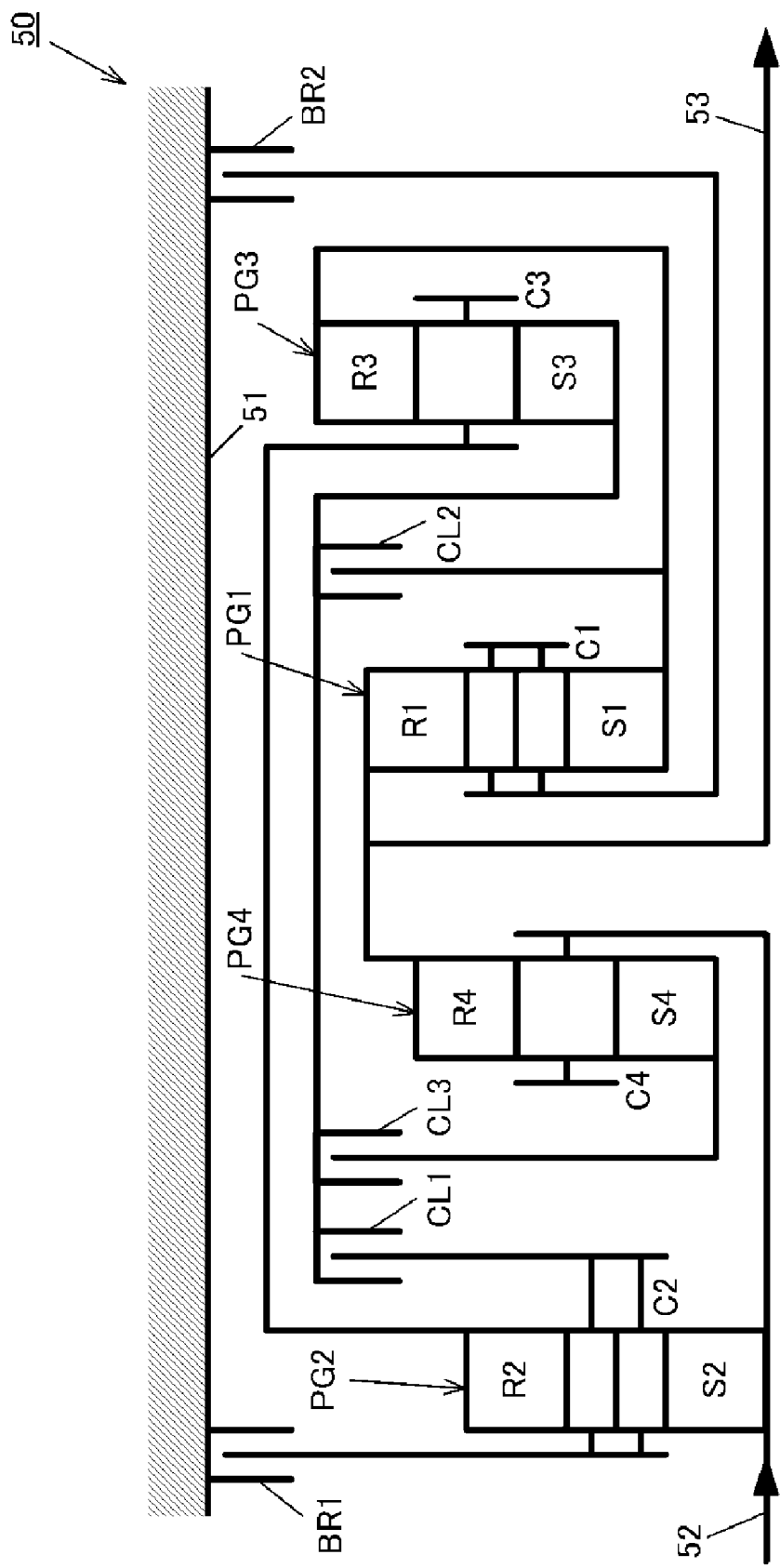
FIG. 15 is a skeleton diagram of an automatic transmission according to a fifth embodiment.

In the automatic transmission 50 according to the fifth embodiment shown in FIG. 15, a second gear set PG2, a fourth gear set PG4, a first gear set PG1, and a third gear set PG3 are arranged in this order from the input side in a transmission case 51. The gear sets are arranged coaxially with an input shaft 52 (and an output shaft 53).

A first clutch CL1 and a third clutch CL3 are placed, in this order from the input side, between the second gear set PG2 and the fourth gear set PG4 along the input shaft. A second clutch CL2 is placed between the first gear set PG1 and the third gear set PG3 along the input shaft. A first brake BR1 is placed near the input side of the second gear set PG2. A second brake BR2 is placed near the output side of the third gear set PG3.

Figure 16:
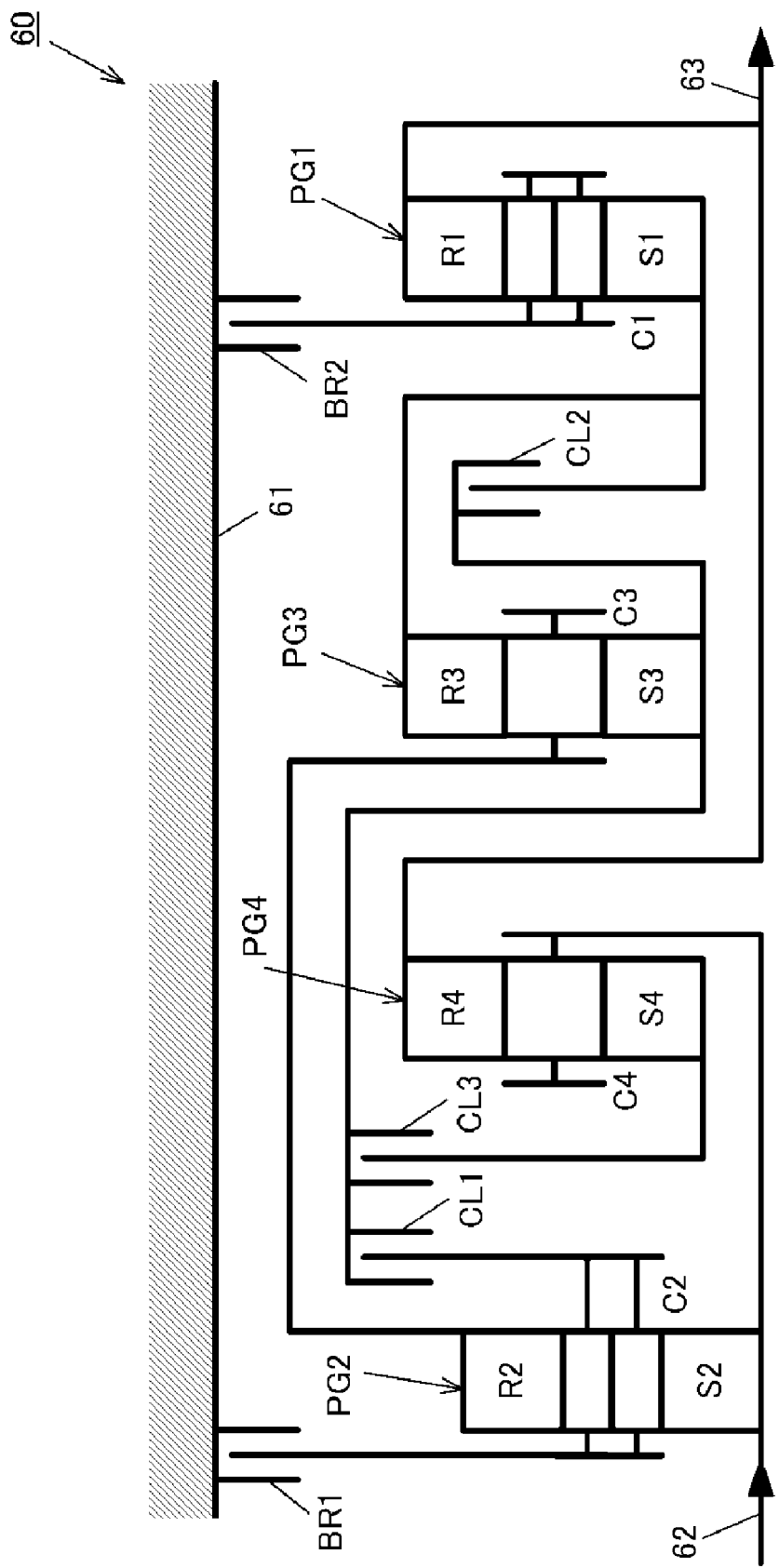
FIG. 16 is a skeleton diagram of an automatic transmission according to a sixth embodiment.

In the automatic transmission 60 according to the sixth embodiment shown in FIG. 16, a second gear set PG2, a fourth gear set PG4, a third gear set PG3, and a first gear set PG1 are arranged in this order from the input side in a transmission case 61. The gear sets are arranged coaxially with an input shaft 62 (and an output shaft 63).

A first clutch CL1 and a third clutch CL3 are placed, in this order from the input side, between the second gear set PG2 and the fourth gear set PG4 along the input shaft. A second clutch CL2 is placed between the third gear set PG3 and the first gear set PG1 along the input shaft. A first brake BR1 is placed near the input side of the second gear set PG2. A second brake BR2 is placed between the second clutch CL2 and the first gear set PG1 along the input shaft.

Figure 17:
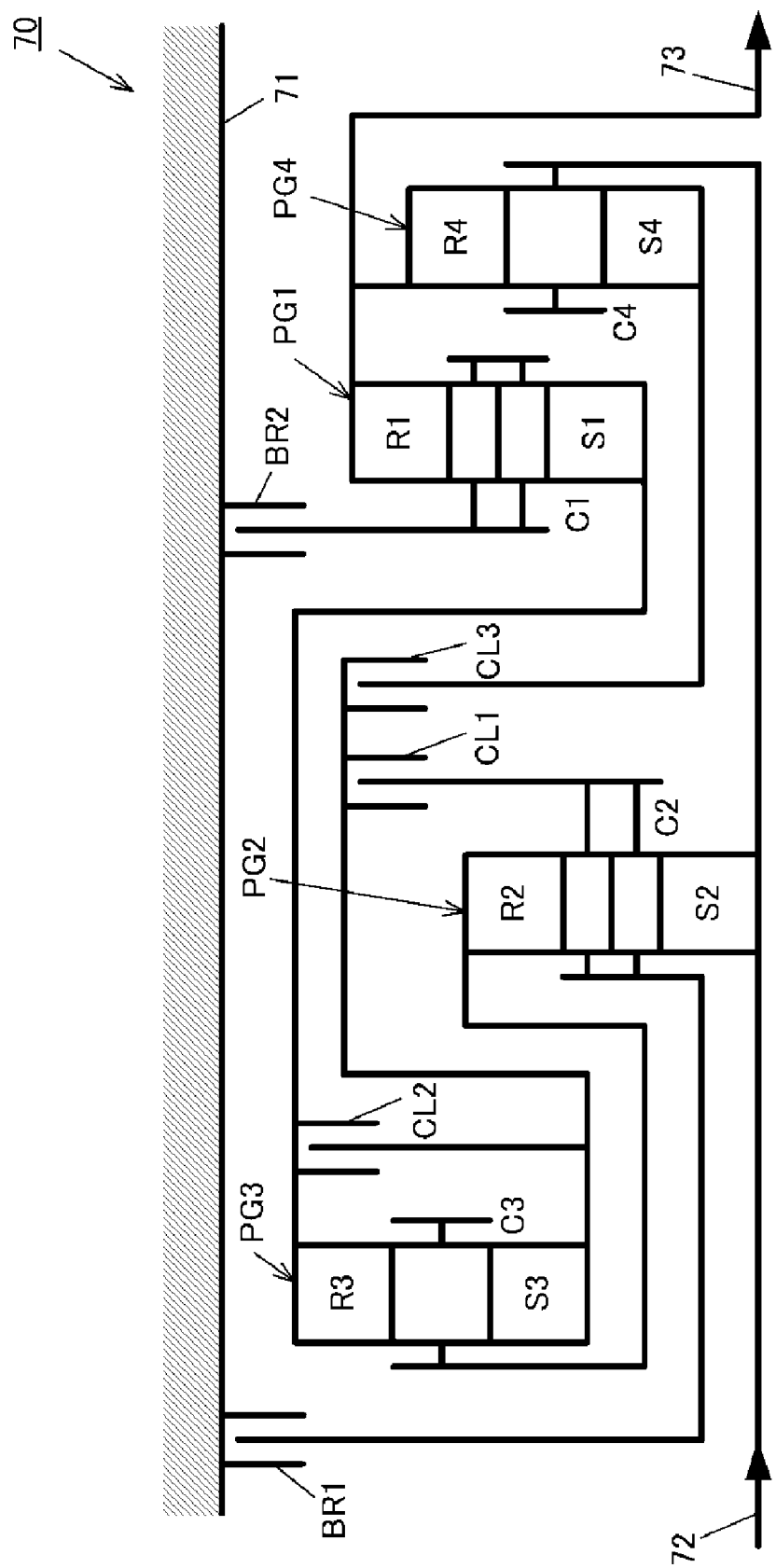
FIG. 17 is a skeleton diagram of an automatic transmission according to a seventh embodiment.

In the automatic transmission 70 according to the seventh embodiment shown in FIG. 17, a third gear set PG3, a second gear set PG2, a first gear set PG1, and a fourth gear set PG4 are arranged in this order from the input side in a transmission case 71. The gear sets are arranged coaxially with an input shaft 72 (and an output shaft 73).

A second clutch CL2 is placed between the third gear set PG3 and the second gear set PG2 along the input shaft. A first clutch CL1 and a third clutch CL3 are placed, in this order from the input side, between the second gear set PG2 and the first gear set PG1 along the input shaft. A first brake BR1 is placed near the input side of the third gear set PG3. A second brake BR2 is placed between the third clutch CL3 and the first gear set PG1 along the input shaft.

Figure 18:
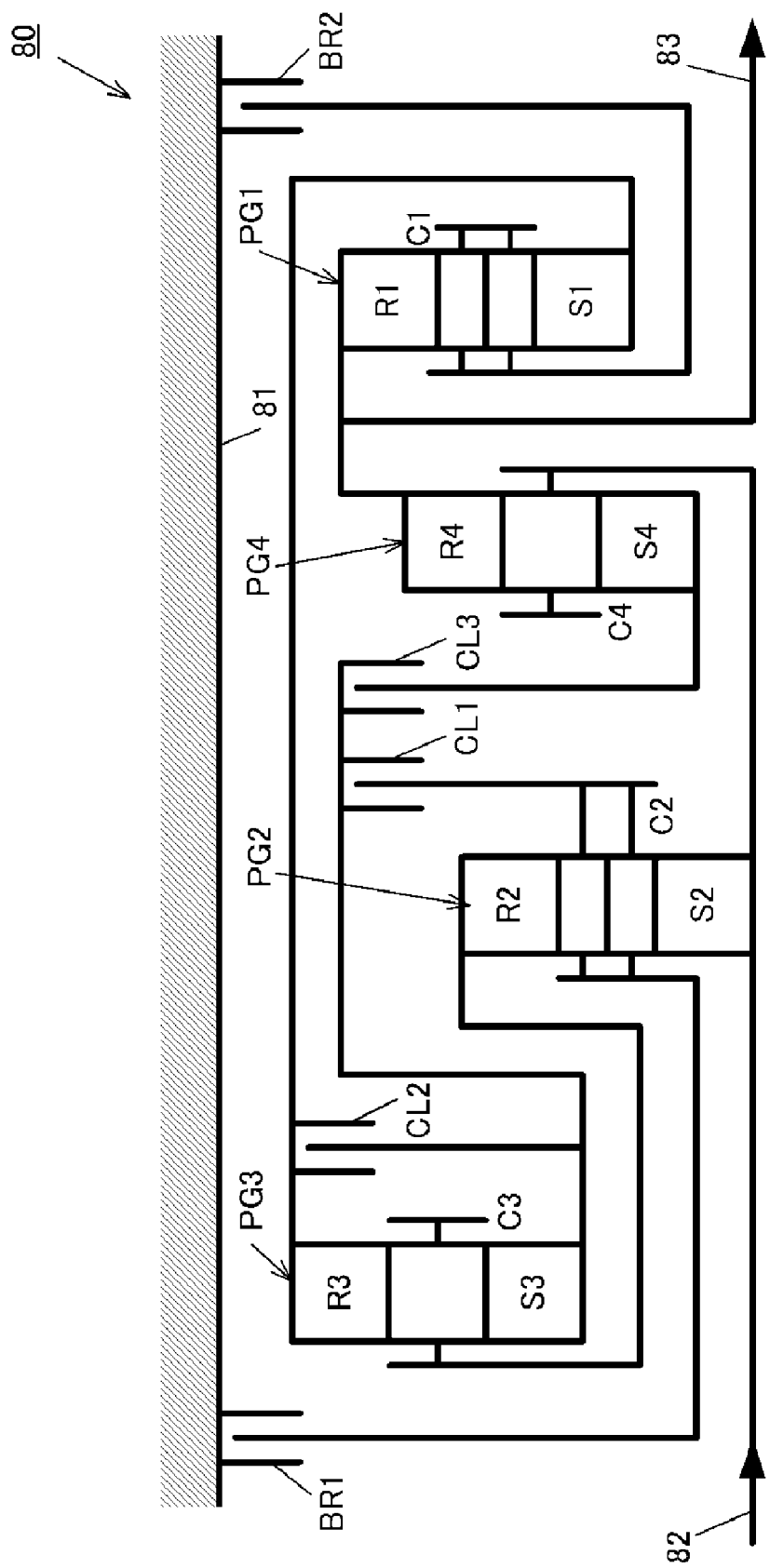
FIG. 18 is a skeleton diagram of an automatic transmission according to an eighth embodiment.

In the automatic transmission 80 according to the eighth embodiment shown in FIG. 18, a third gear set PG3, a second gear set PG2, a fourth gear set PG4, and a first gear set PG1 are arranged in this order from the input side in a transmission case 81. The gear sets are arranged coaxially with an input shaft 82 (and an output shaft 83).

A second clutch CL2 is placed between the third gear set PG3 and the second gear set PG2 along the input shaft. A first clutch CL1 and a third clutch CL3 are placed, in this order from the input side, between the second gear set PG2 and the fourth gear set PG4 along the input shaft. A first brake BR1 is placed near the input side of the third gear set PG3. A second brake BR2 is placed near the output side of the first gear set PG1.

As described above, in the automatic transmissions 20, 30, 40, 50, 60, 70, and 80 according to the second to eighth embodiments, the first to fourth gear sets PG1-PG4 are arranged, along the input shaft, in the different orders from each other and from that in the automatic transmission 10 according to the first embodiment. The frictional coupling elements CL1-CL3, BR1, and BR2 are placed in the different positions. The other configurations, that is, the engagements of the rotating elements (e.g., sun gears, ring gears, and carriers) of the gear sets PG1-PG4, the engagements and disengagements of the rotating elements by the clutches CL1-CL3, and the engagements and disengagements of the rotating elements from the transmission case by the brakes BR1 and BR2 are similar to those in the first embodiment.

Specifically, in the automatic transmissions 20, 30, 40, 50, 60, 70, and 80 according to the second to eighth embodiments as well, the first sun gear S1 and the third ring gear R3 are normally engaged. The first ring gear R1 and the fourth ring gear R4 are normally engaged. The second sun gear S2 and the fourth carrier C4 are normally engaged. The second ring gear R2 and the third carrier C3 are normally engaged. Each of the input shafts 22, 32, 42, 52, 62, 72, and 82 is normally engaged with the second sun gear S2 and the fourth carrier C4. Each of the output shafts 23, 33, 43, 53, 63, 73, and 83 is normally engaged with the first ring gear R1 and the fourth ring gear R4.

The first clutch CL1 engages and disengages the second carrier C2 with and from the third sun gear S3. The second clutch CL2 engages and disengages the third sun gear S3 with and from the third ring gear R3. The third clutch CL3 engages and disengages the third sun gear S3 with and from the fourth sun gear S4.

The first brake BR1 engages and disengages each of the transmission cases 21, 31, 41, 51, 61, 71, and 81 with and from the second carrier C2. The second brake BR2 engages and disengages each of the transmission cases 21, 31, 41, 51, 61, 71, and 81 with and from the first carrier C1.

In each of the automatic transmissions 20, 30, 40, 50, 60, 70, and 80 of the embodiments, three frictional coupling elements are selectively engaged in accordance with the engagement logic table of FIG. 2, thereby providing eight forward gears and one reverse gear, and providing the direct drive (the gear ratio of 1) in the sixth gear, as in the automatic transmission 10 according to the first embodiment.

Now, the number of the teeth of the gears of the first to fourth gear sets PG1-PG4 in the automatic transmissions 10, 20, 30, 40, 50, 60, 70, and 80 are set as shown in, for example, FIG. 19. Then, the gear ratio in each gear stage, and the gear step between each pair of successive forward gears (i.e., the gear ratio in the first gear/the gear ratio in the second gear, the gear ratio in the second gear/the gear ratio in the third gear, the gear ratio in the third gear/the gear ratio in the fourth gear, the gear ratio in the fourth gear/the gear ratio in the fifth gear, the gear ratio in the fifth gear/the gear ratio in the sixth gear, the gear ratio in the sixth gear/the gear ratio in the seventh gear, and the gear ratio in the seventh gear/the gear ratio in the eighth gear) are as shown in FIG. 20.

Figure 21:
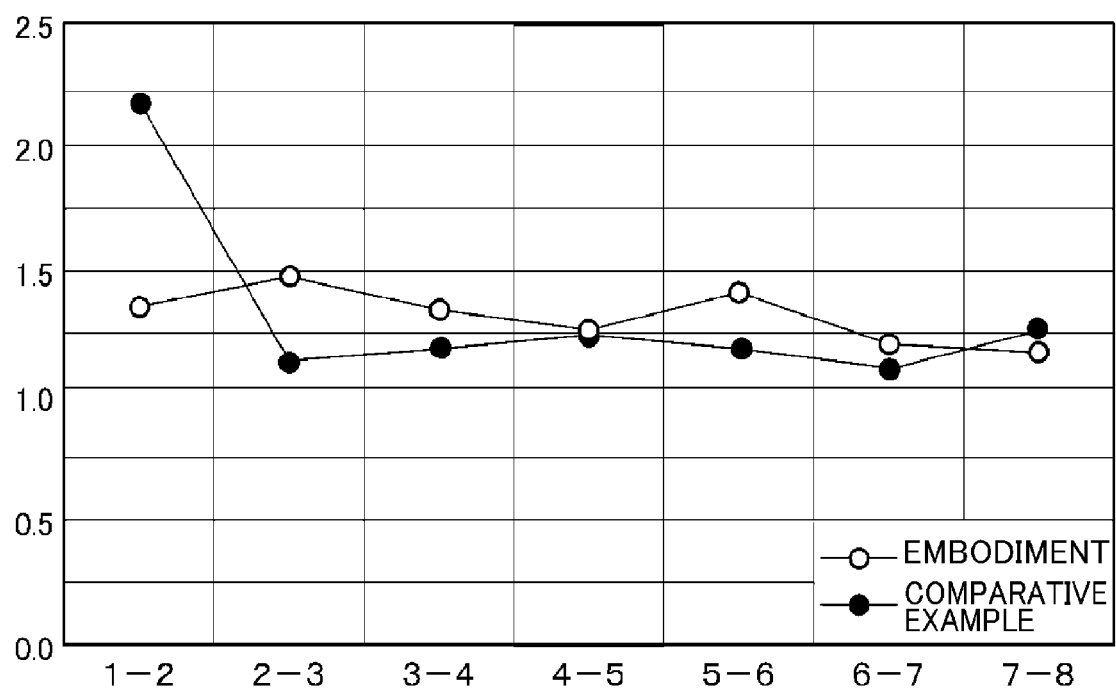
FIG. 21 is a graph illustrating the gear steps of FIG. 20 together with a comparative example.

In FIG. 21, these gear steps (i.e., the "embodiment" in FIG. 21) are compared to the gear steps in the above-described PATENT DOCUMENT 2, which provides the direct drive in the fifth gear (i.e., the "comparative example" in FIG. 21). In the PATENT DOCUMENT 2 (i.e., the comparative example), the gear ratio in the first gear is significantly high. Thus, the gear step between the first gear and the second gear ("1-2" in FIG. 21) is extremely higher than the gear steps between the other successive speeds. By contrast, the gear steps in the automatic transmissions 10, 20, 30, 40, 50, 60, 70, and 80 fall within the narrow range from 1.1 to 1.5. That is, significantly equalized gear steps are provided.

Each of the automatic transmissions 10, 20, 30, 40, 50, 60, 70, and 80 according to the above-described first to the eighth embodiments is a longitudinal transmission particularly for a front-engine, rear-wheel-drive vehicle, in which the output shaft is arranged coaxially with the input shaft. Each transmission may be a transverse transmission for a front-engine, front-wheel-drive vehicle, in which the gear sets and the frictional coupling elements have the same configurations as those of the longitudinal automatic transmission.

Figure 22:
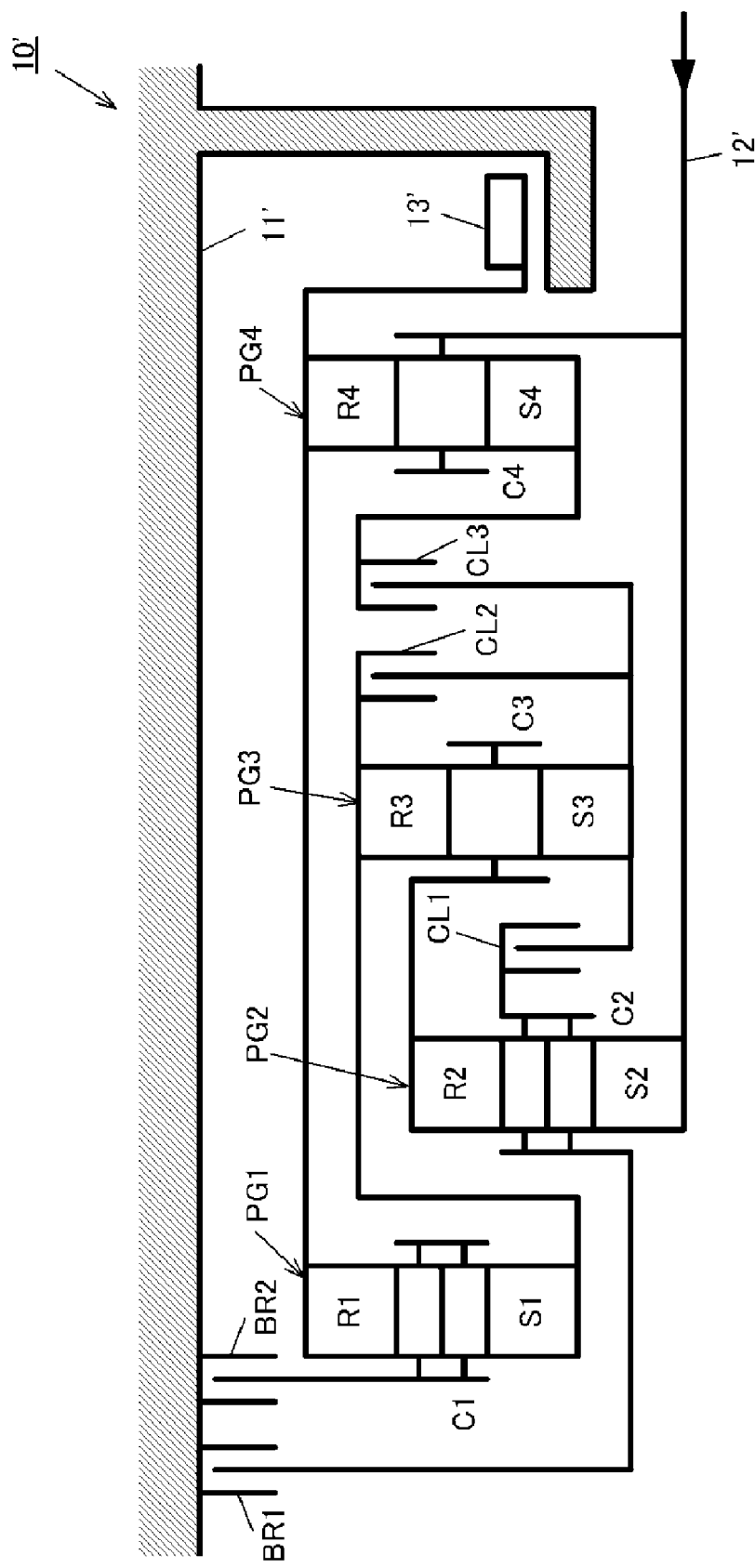
FIG. 22 is a skeleton diagram of an automatic transmission according to a variation of the first embodiment.

For example, an automatic transmission 10' will be described, which is modified from the automatic transmission 10 according to the first embodiment to be of a transverse type. As shown in FIG. 22, in the automatic transmission 10', the input side (i.e., the power source side) is near a fourth gear set PG4 (on the right of FIG. 22). An input shaft 12' extends along the width of a vehicle and is engaged with a power source (e.g., a transverse engine). The input shaft 12' extends from the right to the left of FIG. 22, and is engaged with the second sun gear S2 and the fourth carrier C4.

The automatic transmission 10' includes an output gear 13' in place of the output shaft 13 of the longitudinal automatic transmission 10. The output gear 13' is an output disposed coaxially with the input shaft 12'. Like the output shaft 13, the output gear 13' is disposed at the input side of the fourth gear set PG4 (on the right of FIG. 22), and engaged with a first ring gear R1 and a fourth ring gear R4. The other configurations are the same as those in the longitudinal automatic transmission 10.

Although not shown, the output gear 13' is engaged with an input gear of a differential mechanism via a gear on a counter shaft. The counter shaft extends in parallel to the input shaft 12'. The differential mechanism is integral with the automatic transmission 10'. The gear train ranging from the output gear 13' to the input gear of the differential mechanism forms a final gear mechanism.

Thus, the automatic transmission 10', which provides the direct drive in the sixth gear, has more underdrive gears than transmissions, which provide the direct drive in the fifth gear. This increases the gear ratios at low gear ratios without sacrificing proper gear steps. As a result, in the case where the power source is a small-displacement engine, there is no need to increase the final gear ratio, which is the gear ratio of the final gear mechanism. This prevents an increase in the size of a drive unit caused by an increase in the final gear ratio. The drive unit is formed by integrating an automatic transmission and a differential mechanism. Accordingly, required drive power and start-up acceleration are available, while setting a proper gear step between each pair of successive gears. In addition, degradation in the mountability of the drive unit in an engine compartment is prevented.

Similar to the automatic transmission 10, which is modified to form the automatic transmission 10', the automatic longitudinal transmissions 20, 30, 40, 50, 60, 70, and 80 according to the second to eighth embodiments may be transverse automatic transmissions.

The present invention is not limited to the embodiments described above, and may be modified within the scope of the claims.

For example, the embodiments described above provide eight forward gears. However, nine or more forward gears may be provided by interposing another clutch (i.e., a fourth clutch) between two normally engaged rotating elements of all the rotating elements of the first to fourth gear sets PG1-PG4. In this case, the first clutch CL1, the second clutch CL2, the third clutch CL3 and the fourth clutch are engaged to provide the sixth gear with a gear ratio of 1.

The embodiments described above are mere examples and are not intended to be construed as limiting the scope of the present invention. The scope of the present invention is defined by the claims. All variations and modifications of the claims and equivalents fall within the scope of the present invention.

INDUSTRIAL APPLICABILITY

The present invention is useful as an automatic transmission mounted in a vehicle. The automatic transmission provides direct drive in a sixth gear, and properly sets a gear step between each pair of successive gears. In these respects, the present invention is industrially applicable.

DESCRIPTION OF REFERENCE CHARACTERS

10-80, 10' Automatic Transmission
11-81, 11' Transmission Case
12-82 Input Shaft
13-83 Output Shaft (Output)
13' Output Gear (Output)
PG1 First Planetary Gear Set
PG2 Second Planetary Gear Set
PG3 Third Planetary Gear Set
PG4 Fourth Planetary Gear Set
S1 First Sun Gear
S2 Second Sun Gear
S3 Third Sun Gear
S4 Fourth Sun Gear
R1 First Ring Gear
R2 Second Ring Gear
R3 Third Ring Gear
R4 Fourth Ring Gear
C1 First Carrier
C2 Second Carrier
C3 Third Carrier
C4 Fourth Carrier
CL1 First Clutch
CL2 Second Clutch
CL3 Third Clutch
BR1 First Brake
BR2 Second Brake

The invention claimed is:

1. An automatic transmission comprising in a transmission case:
   an input shaft engaged with a power source;
   an output arranged coaxially with the input shaft, and engaged with a differential mechanism;
   a first planetary gear set being of a double pinion type, and including a first sun gear, a first carrier, and a first ring gear;
   a second planetary gear set being of the double pinion type, and including a second sun gear, a second carrier, and a second ring gear;
   a third planetary gear set being of a single pinion type, and including a third sun gear, a third carrier, and a third ring gear;
   a fourth planetary gear set being of the single pinion type, and including a fourth sun gear, a fourth carrier, and a fourth ring gear;
   a first clutch;
   a second clutch;
   a third clutch;
   a first brake; and
   a second brake, wherein
   the input shaft, the second sun gear, and the fourth carrier are engaged,
   the output, the first ring gear, and the fourth ring gear are engaged,
   the first sun gear and the third ring gear are engaged,
   the second ring gear and the third carrier are engaged,
   the first clutch engages and disengages the second carrier with and from the third sun gear,
   the second clutch engages and disengages the third sun gear with and from the third ring gear,
   the third clutch engages and disengages the third sun gear with and from the fourth sun gear,
   the first brake engages and disengages the second carrier with and from the transmission case,
   the second brake engages and disengages the first carrier with and from the transmission case, and
   a gear ratio of the automatic transmission is 1 in a sixth gear.

2. The automatic transmission of claim 1, wherein
   the automatic transmission provides eight forward gears and one reverse gear,
   the second clutch, the first brake, and the second brake are engaged to provide a first gear,
   the first clutch, the first brake, and the second brake are engaged to provide a second gear,
   the first clutch, the second clutch, and the second brake are engaged to provide a third gear, the first clutch, the third clutch, and the second brake are engaged to provide a fourth gear,
the second clutch, the third clutch, and the second brake are engaged to provide a fifth gear,
the first clutch, the second clutch, and the third clutch are engaged to provide the sixth gear,
the second clutch, the third clutch, and the first brake are engaged to provide a seventh gear,
the first clutch, the third clutch, and the first brake are engaged to provide an eighth gear, and
the third clutch, the first brake, and the second brake are engaged to provide a reverse gear.

* * * * *